US011275411B2

(12) United States Patent
Matsuo

(10) Patent No.: US 11,275,411 B2
(45) Date of Patent: Mar. 15, 2022

(54) ELECTRONIC APPARATUS, SYSTEM AND POWER SUPPLY METHOD

(71) Applicant: KABUSHIKI KAISHA TOSHIBA, Tokyo (JP)

(72) Inventor: Ryoko Matsuo, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 576 days.

(21) Appl. No.: 16/289,458

(22) Filed: Feb. 28, 2019

(65) Prior Publication Data

US 2019/0391620 A1 Dec. 26, 2019

(30) Foreign Application Priority Data

Jun. 20, 2018 (JP) .............................. JP2018-117379

(51) Int. Cl.
*G06F 1/16* (2006.01)
*H02J 50/40* (2016.01)
*H02J 7/02* (2016.01)

(52) U.S. Cl.
CPC .......... *G06F 1/1683* (2013.01); *G06F 1/1698* (2013.01); *H02J 7/025* (2013.01); *H02J 50/40* (2016.02)

(58) Field of Classification Search
CPC ...... G06F 1/1683; G06F 1/1698; H02J 7/025; H02J 50/40; H02J 50/80
See application file for complete search history.

(56) References Cited

U.S. PATENT DOCUMENTS 6,072,792 A * 6/2000 Mazur .................. H04W 52/42
370/345
9,882,430 B1 * 1/2018 Leabman ................ H04W 4/80
(Continued)

FOREIGN PATENT DOCUMENTS

WO WO-9901949 A1 * 1/1999 ............ H04W 52/42
WO WO-2016109313 A1 * 7/2016 ........... H04B 17/318
(Continued)

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std The Institute of Electrical and Electronics Engineers, Inc., Dec. 2013, pp. 1-425.

*Primary Examiner* — Stacy Whitmore
(74) *Attorney, Agent, or Firm* — Foley & Lardner LLP

(57) ABSTRACT

According to one embodiment, an electronic apparatus includes a power transmitter and controlling circuitry. The electronic apparatus is connectable with a first wireless communicator conforming to a first wireless communication scheme. The power transmitter supplies power to one or more apparatuses at one of a first beam pattern and a second beam pattern. The control circuitry sets a first power supply period on a first condition that the first power supply period is prohibited to overlap with a communication period of the first wireless communicator if the power is supplied at the first beam pattern, and sets a second power supply period on a second condition that the second power supply period is allowed to at least partially overlap with the communication period if the power is supplied at the second beam pattern.

15 Claims, 18 Drawing Sheets

(56) References Cited

U.S. PATENT DOCUMENTS

| | | | | |
|---|---|---|---|---|
| 9,941,707 | B1 * | 4/2018 | Leabman | H02J 50/20 |
| 10,148,097 | B1 * | 12/2018 | Leabman | H02J 50/20 |
| 10,291,055 | B1 * | 5/2019 | Bell | H02J 50/27 |
| 11,159,058 | B2 * | 10/2021 | Vedady Moghadam Nanehkaran | H02J 7/0047 |
| 2012/0280574 | A1 | 11/2012 | Hur et al. | |
| 2012/0299538 | A1 * | 11/2012 | Arai | H02J 7/0044 320/108 |
| 2016/0218426 | A1 * | 7/2016 | Kelly | H01Q 1/38 |
| 2018/0220417 | A1 * | 8/2018 | Matsuo | H04W 72/0406 |
| 2020/0006988 | A1 * | 1/2020 | Leabman | H02J 50/80 |
| 2021/0021330 | A1 * | 1/2021 | Khoshnevisan | H04B 7/0617 |

FOREIGN PATENT DOCUMENTS

| | | | | |
|---|---|---|---|---|
| WO | WO-2019108137 A1 * | 6/2019 | | H02J 7/345 |
| WO | WO-2019178776 A1 * | 9/2019 | | H04W 74/0808 |

* cited by examiner

|  | WEIGHT PARAMETER REPRESENTING WEIGHT OF EACH ANTENNA |
|---|---|
| BEAM PATTERN 1 | W1=(W1a, W1b) |
| BEAM PATTERN 2 | W2=(W2a, W2b) |
| . . . | . . . |
| BEAM PATTERN N | WN=(WNa, WNb) |

FIG. 7

ELECTRONIC APPARATUS, SYSTEM AND POWER SUPPLY METHOD

CROSS REFERENCE TO RELATED APPLICATIONS

This application is based upon and claims the benefit of priority from the prior Japanese Patent Application No. 2018-117379, filed on Jun. 20, 2018, the entire contents of which are incorporated herein by reference.

FIELD

Embodiments described herein relate to an electronic apparatus, a system and a power supply method.

BACKGROUND

Wireless power supply is a technique of achieving power transmission, without any cable, through electromagnetic induction, magnetic field resonance, radio waves or the like. The wireless power supply negates the need of physical connection between devices. Accordingly, the convenience is high. Furthermore, the risks of electric leakage and electric shocks are reduced. Accordingly, the safety can be secured. Because of these advantages, the wireless power supply has been becoming widespread, specifically in mobile and vehicle-mounting fields.

Various schemes for wireless power supply have been developed. There is an object to realize efficient power supply schemes that achieve reduction in charge time, increase in transmittable power, and a high transmission efficiency.

In a case of microwave power supply as wireless power supply, coexistence with WLAN (Wireless Local Area Network) that uses a microwave band is required. For example, in a frequency band higher than the WLAN, the microwave power supply is performed through non-modulated wave, i.e., continuous waves (CWs). Unfortunately, even if a band different from the WLAN band is used, there is a possibility that high-power transmission interferes with the WLAN in a close frequency band.

BRIEF DESCRIPTION OF THE DRAWINGS

FIG. 7 shows an example of a pattern table;

DETAILED DESCRIPTION

Figure 1:
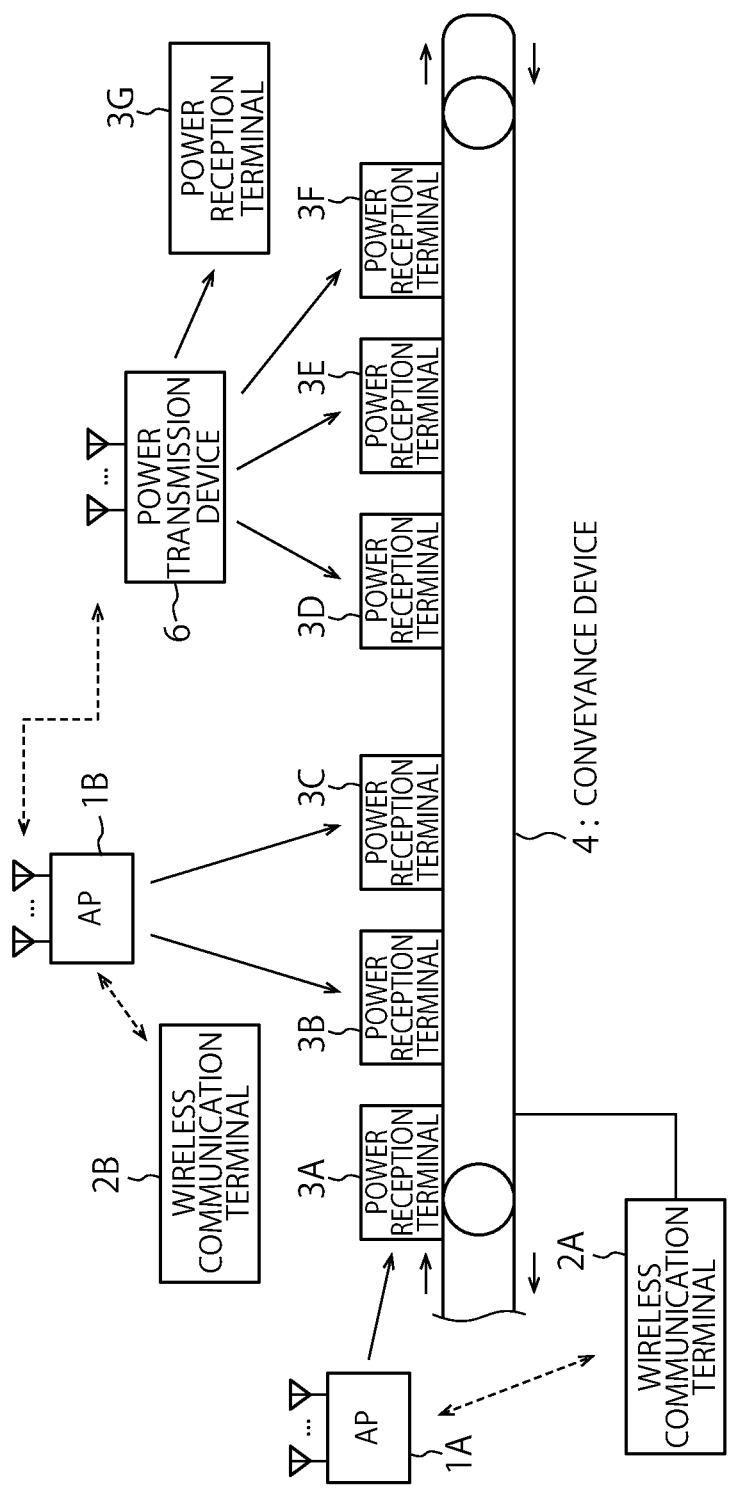
FIG. 1 shows an example of application of a wireless power supply system according to a first embodiment to a factory.

According to one embodiment, an electronic apparatus includes a power transmitter and controlling circuitry. The electronic apparatus is connectable with a first wireless communicator conforming to a first wireless communication scheme. The power transmitter supplies power to one or more apparatuses at one of a first beam pattern and a second beam pattern. The control circuitry sets a first power supply period on a first condition that the first power supply period is prohibited to overlap with a communication period of the first wireless communicator if the power is supplied at the first beam pattern, and sets a second power supply period on a second condition that the second power supply period is allowed to at least partially overlap with the communication period if the power is supplied at the second beam pattern.

Hereinafter, referring to the drawings, embodiments of the present invention are described.

First Embodiment

FIG. 1 shows an example of application of a wireless power supply system that is a system according to a first embodiment to a factory. In the factory, access points (APs) 1A and 1B that are base stations, wireless communication terminals 2A and 2B, power reception terminals 3A to 3G, and a power transmission device 6 are arranged. Furthermore, a conveyance device (belt conveyor) 4 that conveys the power reception terminals 3A to 3F are arranged. Other devices or facilities may be further arranged. The AP 1A and the AP 1B are collectively called an AP 1. The wireless communication terminals 2A and 2B are collectively called a wireless communication terminal 2. The power reception terminals 3A to 3G are collectively called a power reception terminal 3. In this embodiment, an example is described where the wireless power supply system is disposed in the factory. Alternatively, the wireless power supply system may be disposed in another facility, such as a power plant, or disposed in a mobile unit, such as an automobile, a railway vehicle, a vessel, an aircraft, or a construction machine. As described above, the installation site of the wireless power supply system is not specifically limited. The disposition of the power reception terminal 3 on the belt conveyor is only an example. Alternatively, the terminal may be disposed on a facility fixed in the factory, or on a moving facility or device that is other than the belt conveyor (a conveyance facility, an autonomous moving robot, etc. in a factory).

The AP 1 is an integrated AP that has a function of wirelessly communicating with the wireless communication terminal 2 and the power transmission device 6 according to a first wireless communication scheme, a function of wirelessly communicating with the power reception terminal 3 according to a second wireless communication scheme, and a function of wirelessly supplying power (wireless power transmission) to the power reception terminal 3. The integrated AP is not limited thereto. For example, among these functions, the function of wirelessly communicating with the power reception terminal 3 according to the second wireless communication scheme is not included. The first wireless communication scheme is, for example, a wireless communication scheme that conforms to IEEE 802.11 series, or a wireless LAN (Local Area Network) standard that is a subsequent standard. Here, the wireless LAN is only an example. Alternatively, the wireless communication scheme used by AP 1 may be IEEE 802.16 series or a subsequent standard mobile communication scheme, or another communication scheme. In the following description, it is assumed that the AP performs wireless LAN communication. The second wireless communication scheme is, for example, BLE (Bluetooth® Low Energy). The BLE is an example of the wireless communication scheme. Alternatively, communication other than the BLE, for example, DSRC (Dedicated Shor Range Communications), ZigBee®, Z-Wave®, Wireless USB, wireless LAN communication or the like may be performed. NFC (Near field radio communication) is not excluded. The AP 1 may be disposed above the conveyance device 4 (for example, on the ceiling), disposed on a pillar or a wall, disposed on a floor or the ground, or at another site.

The wireless communication terminal 2 is a device (a first apparatus) that wirelessly communicates with the AP 1 according to the first wireless communication scheme (here, a wireless LAN). The wireless communication terminal 2 is, for example, a device in the factory, such as a manufacturing device, a control device, an inspection instrument, a monitor device, a sensor device, an automobile, or a drone. In the example in the diagram, the wireless communication terminal 2A is a control device that controls the conveyance device 4. The conveyance device 4 may be communicable with the AP 1 according to the first wireless communication scheme. In this case, the conveyance device 4 is also a wireless communication terminal.

Figure 2:
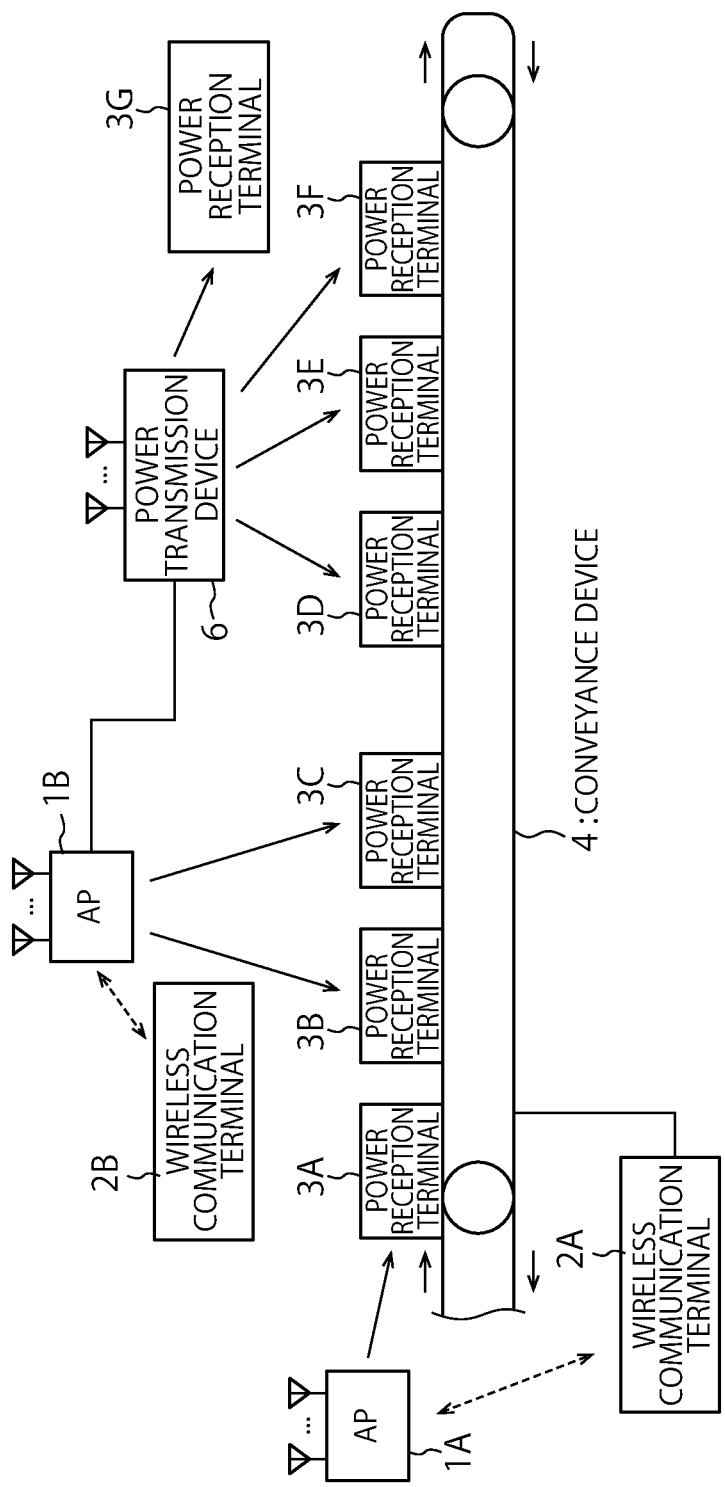
FIG. 2 shows a configuration where a power transmission device is wiredly connected to an access point in FIG. 1.

The power transmission device 6 is a device for wirelessly supplying power to the power reception terminal 3. The power transmission device 6 operates under control of the AP 1B. The power transmission device 6 is connected wirelessly or wiredly to the AP 1B. In this example, the power transmission device 6 is wirelessly connected to the AP 1B, and wirelessly communicates according to the first wireless communication scheme. In this case, the power transmission device 6 may operate as a station (STA). In another example, as shown in FIG. 2, the power transmission device 6 may be wiredly connected to the AP 1B. In an example of wired connection, the power transmission device 6 may be directly connected to the AP 1B through a cable or the like, or connected to the AP 1B via a backbone network. The power transmission device 6 may be communicable with the power reception terminal 3 according to the second wireless communication scheme. The power transmission device 6 may be mounted on the AP. For example, the power transmission device 6 may be mounted on the AP 1B and be configured integrally with the AP 1B. The power transmission device 6 may be disposed above the conveyance device 4 (for example, on the ceiling), disposed on a pillar or a wall, disposed on a floor or the ground, or at another site.

The power reception terminal 3 is a device (which corresponds to one or more apparatuses or a second apparatus) mounted with an energy storage device (a secondary battery, a storage battery, a capacitor or the like; hereinafter assumed as a storage battery in a unified manner). The power reception terminal 3 charges the storage battery with the power received from the AP 1 or the power transmission device 6 through wireless power supply. The power reception terminal 3 is communicable with at least one of the AP 1 and the power transmission device 6 according to the second wireless communication scheme. However, the power reception terminal 3 does not necessarily have the function of communication according to the second wireless communication scheme. Among the power reception terminals 3A to 3G, the power reception terminals 3A to 3F are, for example, products produced in the factory (e.g., BLE terminals or sensor terminals), or half-finished products in the middle of production, and are conveyed by the conveyance device 4 from an upstream side to a downstream side on a conveyance path. The conveyance device 4 may convey the power reception terminals on the conveyance path at a constant speed, or may repeat temporarily stopping the conveyance during power supply and restarting the conveyance after power supply. Such control is performed by the wireless communication terminal (control device) 2A, for example. The power reception terminal 3G is a device in the factory and is, for example, a manufacturing device, an inspection instrument, a monitor device (monitoring device), a control device, an automobile, or a drone. The conveyance device 4 may be a power reception terminal that can receive power from the power transmission device 6. The power reception terminal exemplified here is only one example. The terminal may be another type of device.

The power reception terminal 3 may be communicable with the AP 1 according to the first wireless communication scheme. In this case, the power reception terminal 3 serves as a power reception terminal (which corresponds to one or more apparatuses or a second apparatus) and also serves as a wireless communication terminal (a first apparatus). The wireless communication terminal 2 may be capable of receiving power from the power transmission device 6. In this case, the wireless communication terminal 2 serves as a wireless communication terminal (a first apparatus) and also serves as a power reception terminal (which corresponds to one or more apparatuses or a second apparatus).

In the diagram, broken lines with bidirectional arrows indicate wireless communication according to the first wireless communication scheme. Solid lines with unidirectional arrows indicate wireless power supply. In the example shown in the diagram, the AP 1A wirelessly communicates with the wireless communication terminal 2A, and wirelessly supplies power to the power reception terminal 3A. The AP 1B wirelessly communicates with the wireless communication terminal 2B, and wirelessly supplies power to the power reception terminals 3B 3C. The power transmission device 6 wirelessly supplies power to the power reception terminals 3D to 3G under control of the AP 1B.

For example, the AP 1A obtains data required for the operation of the wireless communication terminal 2A (e.g., firmware) from a server, not shown, and transmits the data to the wireless communication terminal 2A according to the first wireless communication scheme, and receives data representing the state of the wireless communication terminal 2A or the conveyance device 4 according to the first wireless communication scheme and transmits the data to the server.

The AP 1A forms a beam pattern (power supply pattern) that has a directionality to the power reception terminal 3, and charges the storage battery of the power reception terminal 3A with the formed beam pattern. Likewise, the AP 1B charges the storage batteries of the power reception terminals 3B and 3C with a beam pattern formed for the power reception terminals 3B and 3C. Wireless power supply to the power reception terminals 3B and 3C may be sequentially performed, or may be simultaneously performed with the same beam pattern. The power transmission device 6 performs wireless power supply with a beam pattern formed for the power reception terminals 3D to 3G. Wireless power supply to the power reception terminals 3D and 3G may be sequentially performed, or may be simultaneously performed with the same beam pattern.

The AP 1A, the AP 1B or the power transmission device 6 may communicate with the power reception terminal 3 according to the second wireless communication scheme and obtain, from the power reception terminal 3, information for identifying parameters (the power supply amount, the number of power supplies, the transmission power value, etc.) required for wirelessly supplying power to the power reception terminal 3, before power supply to the power reception terminal 3. The power transmission device 6 may transmit the obtained information to the AP 1B. It is assumed that in each of the AP 1A and the AP 1B, wireless communication and wireless power supply are performed at different timings. However, a simultaneous performing mode is not excluded.

For the AP 1 (AP 1A and AP 1B) and the power transmission device 6, power reception terminals that are to be wirelessly supplied with power may be preliminarily designated. For example, the AP 1 receives identification information on a device serving as a target to which the AP 1 or the power transmission device 6 wirelessly supplies power, from an external server or a terminal operated by an administrator of the factory (administrator terminal), and stores the information in an internal memory. The AP 1 or the power transmission device 6 may communicate with the power reception terminal 3 according to the second wireless communication scheme (BLE etc.), and regard the power reception terminal 3 as a power supply target if the identification information on the power reception terminal 3 coincides with the held identification information. In another example, the AP 1 or the power transmission device 6 communicates with the power reception terminal 3 according to the second wireless communication scheme, and checks the amount of charges (remaining electric energy) in the storage battery mounted on the power reception terminal 3. The power reception terminals 3 having an amount of charges less than a threshold is regarded as power supply targets. The power reception terminals 3 having been supplied with power by an upstream AP or power transmission device but have a remaining electric energy less than the threshold may be recharged by another downstream AP or another power transmission device. The power reception terminal 3 that is a power supply target may be identified according to a method other than the methods described here. For example, the power reception terminal being conveyed may be detected by a sensor provided along the conveyance path of the carrier device or a sensor provided in the AP 1 or the power transmission device 6, and the detected power reception terminal may be regarded as the power supply target. The power reception terminal that is the power supply target of the power transmission device 6 may be identified by the AP 1, and information on the identified power supply target may be notified to the power transmission device 6.

Figure 3:
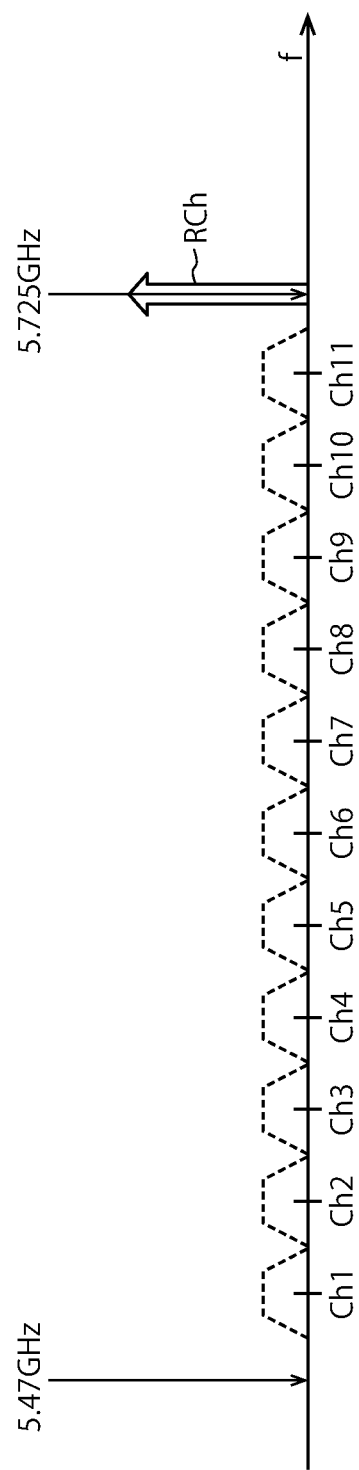
FIG. 3 shows an example of the relationship between a frequency band used for wireless LAN and a frequency band used for wireless power supply.
Figure 4:
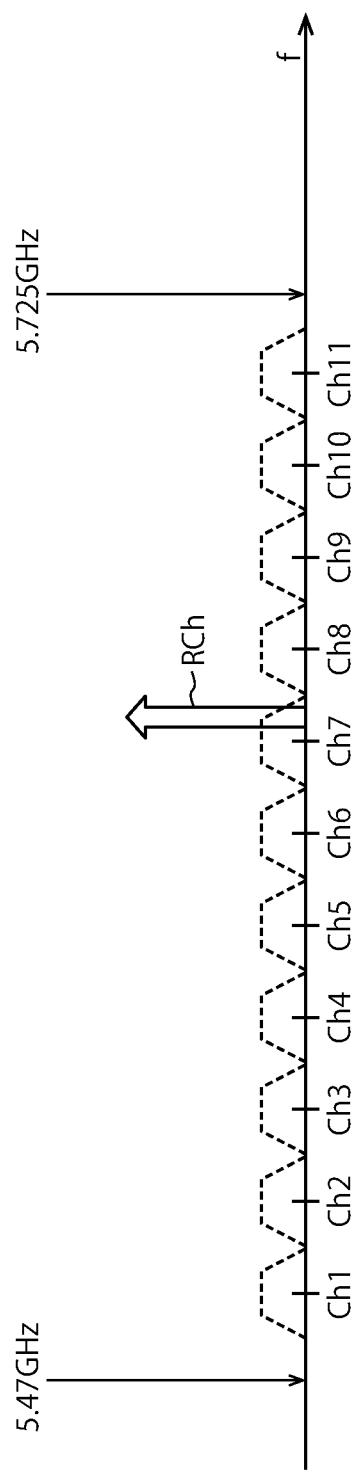
FIG. 4 shows an example where a wireless power supply channel is present in the frequency band of the wireless LAN.

Here, referring to FIG. 3, a frequency band used for wireless LAN and a frequency band used for wireless power supply are described. FIG. 3 shows an example of the relationship between the frequency band used for wireless LAN and the frequency band used for wireless power supply. In this example, 5.6 GHz band is used for wireless LAN. Multiple frequency channels (wireless LAN channel) are disposed in the band. Each AP 1 selects one or more frequency channels from among frequency channels Ch1 to Ch10, and communicates with the wireless communication terminals (wireless communication terminals 2A and 2B). In a case where the communication between the AP 1B and the power transmission device 6 is through wireless LAN, the channel for communication may be a channel at 5.6 GHz or a channel in another band other than the band. Hereinafter, the frequency channel used for the wireless LAN is sometimes called a wireless LAN channel. Meanwhile, the wireless power supply frequency band (called a wireless power supply channel) is disposed in a band different from channels used for the wireless LAN. In this example, the wireless power supply frequency band (called a wireless power supply channel) is 5.725 GHz band. That is, the center frequency of the wireless power supply frequency band is disposed out of the channels. In this case, a wireless power supply channel RCh is close to the upper end of the channels. Accordingly, there is a possibility that high power transmission interferes with the adjacent wireless LAN channels (e.g., Ch 11, Ch 10, etc.). The wireless power supply channel RCh may be present in the frequency band of the wireless LAN. FIG. 4 shows an example in this case. Also in this case, wireless power supply in the wireless power supply channel RCh can interfere with adjacent channels Ch6, Ch7, Ch8, etc. The wireless power supply channel RCh may have the same frequency (center frequency) as the wireless LAN channel, or a frequency different therefrom.

In this embodiment, wireless power supply to the power reception terminals 3 (3A to 3G) is performed while suppressing interference with the communication through the adjacent wireless LAN channels. In a specific example, when the AP 1B wirelessly supplies power to the power reception terminals 3D and 3E using the power transmission device 6, control is performed so as to suppress interference with the wireless LAN channel used by the own station. The radio wave channel environment varies owing to the movement of people in the factory and mobile units (automobiles and drones), and can also vary owing to installation of a new device. Furthermore, the power reception terminal sometimes moves (including conveyance). Accordingly, the beam pattern suitable for the power reception terminal can also vary according to conditions. Consequently, a method capable of dynamically supporting such variation is required. Hereinafter, referring to FIG. 5, an overview of an example of this method is described.

Figure 5:
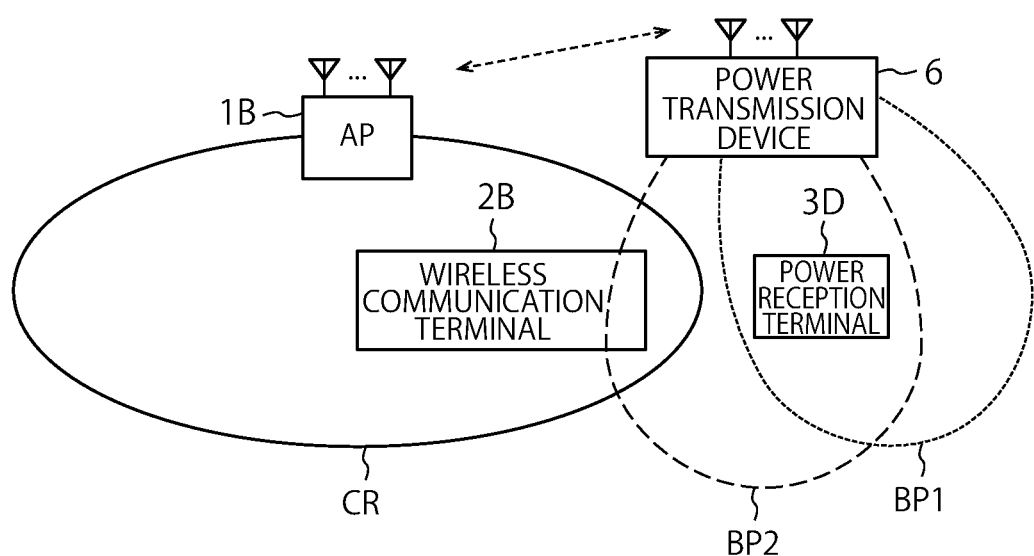
FIG. 5 illustrates an example of wirelessly supplying power to a power reception terminal while suppressing interference with an adjacent wireless LAN channel.

FIG. 5 illustrates an example of wirelessly supplying power to the power reception terminal while suppressing interference with an adjacent wireless LAN channel. In FIG. 5, the AP 1B performs wireless LAN communication with the wireless communication terminal 2B in a coverage CR using a certain wireless LAN channel. The power transmission device 6 wirelessly supplies power to the power reception terminal 3D using the wireless power supply channel under control of the AP 1B. The wireless power supply channel is adjacent to the wireless LAN channel used by the AP 1B.

It is assumed that the power transmission device 6 wirelessly supplies power to the power reception terminal 3D through a beam pattern BP1. In this case, the beam pattern BP1 does not overlap the coverage CR. Consequently, the pattern does not interfere with the wireless LAN communication in the coverage CR. The beam pattern that does not interfere with the adjacent wireless LAN channel as described above is sometimes called "space sharing pattern" (second beam pattern) in the following description. Accordingly, when the beam pattern used to supply power to the power reception terminal 3D is the space sharing pattern, the power transmission device 6 may wirelessly supply power using this beam pattern. That is, when the power is supplied through the second beam pattern, the power supply period through the second beam pattern (second power supply period) can be set on a condition allowing at least partial or entire overlapping with the period of communication through the wireless LAN channel (first communication period). That is, the second power supply period may partially or entirely overlap the wireless LAN communication period (first communication period). Furthermore, a case with no overlap at all can be adopted.

Meanwhile, it is also assumed that the power transmission device 6 wirelessly supplies power to the power reception terminal 3D through a beam pattern BP2. In this case, the beam pattern BP2 overlaps the coverage CR. Accordingly, the pattern can interfere with the communication of the wireless communication terminal 2B. In such a case, the AP 1B preliminarily secures (or reserves) a period allowing the wireless LAN channel to be exclusively used (the wireless LAN communication by the other wireless communication terminals in the coverage CR is prohibited), and the power transmission device 6 is then allowed to wirelessly supply power through the beam pattern BP2. Accordingly, the power can be wirelessly supplied while suppressing interference with the wireless LAN communication.

To secure the period of use of the wireless LAN channel, the AP 1B transmits a "CTS-to-self" frame, for example. The "CTS-to-self" frame is a CTS frame where the receiver address (RA) field is set to the own address (i.e., the BSSID or MAC address of the AP 1B). The wireless communication terminal (wireless communication terminal 2B) that is in the coverage CR and has received the "CTS-to-self" frame from the AP 1B is prohibited from transmission during the period set in a "Duration/ID" field of the CTS frame. Specifically, the wireless communication terminal having received the CTS frame that is not destined for the own terminal sets a NAV (Network Allocation Vector) for a period having the value of the length set in the "Duration/ID" field, from the end of the frame, and does not perform transmission during this period. This period is called a transmission prohibited period or a NAV period. Wireless power supply in this period can suppress interference with the wireless LAN communication. That is, setting of a first power supply period in this period prevents the first power supply period from overlapping the wireless LAN communication period (first communication period). The AP 1B (or the power transmission device 6) may determine a period required for wireless power supply. The AP 1B may set a value according to the length of the determined period in the "Duration/ID" field.

Instead of the "CTS-to-self" frame, another frame may be defined and used. For example, a trigger frame is defined as a frame for securing the period of using a wireless medium. The period length intended to be secured is set in a predetermined field (which may be the "Duration/ID" field, a frame body field, or another field) of the trigger frame. The receiver address is set as a broadcast address or a multicast address. The wireless communication terminal having received the trigger frame is prevented from transmission during the period set in the predetermined field.

To suppress interference with the wireless LAN communication as described above, a beam pattern required to use after securing the period of using the wireless LAN channel is sometimes called "time sharing pattern" (first beam pattern). That is, in a case where the power is supplied through the first beam pattern, the power supply period (first power supply period) is required to be set on a condition preventing overlapping with the period of communication with the wireless LAN channel (first communication period).

As described above, the method of wirelessly supplying the power is changed according to whether the beam pattern used to supply the power to the power reception terminal 3D is the space sharing pattern or the time sharing pattern. In the former case, the power may be wirelessly supplied without a specific process. However, in the latter case, the power is required to be supplied after the period of using the wireless LAN channel is secured.

As described above, this embodiment is characterized by performing determination of the beam pattern used for power supply, and control of the power supply method (the power is wirelessly supplied after the period of using the wireless LAN channel is secured, or the power is wirelessly supplied without such a securing process), so as to suppress interference with the adjacent wireless LAN channel. Hereinafter, this embodiment is described in further detail.

Figure 6:
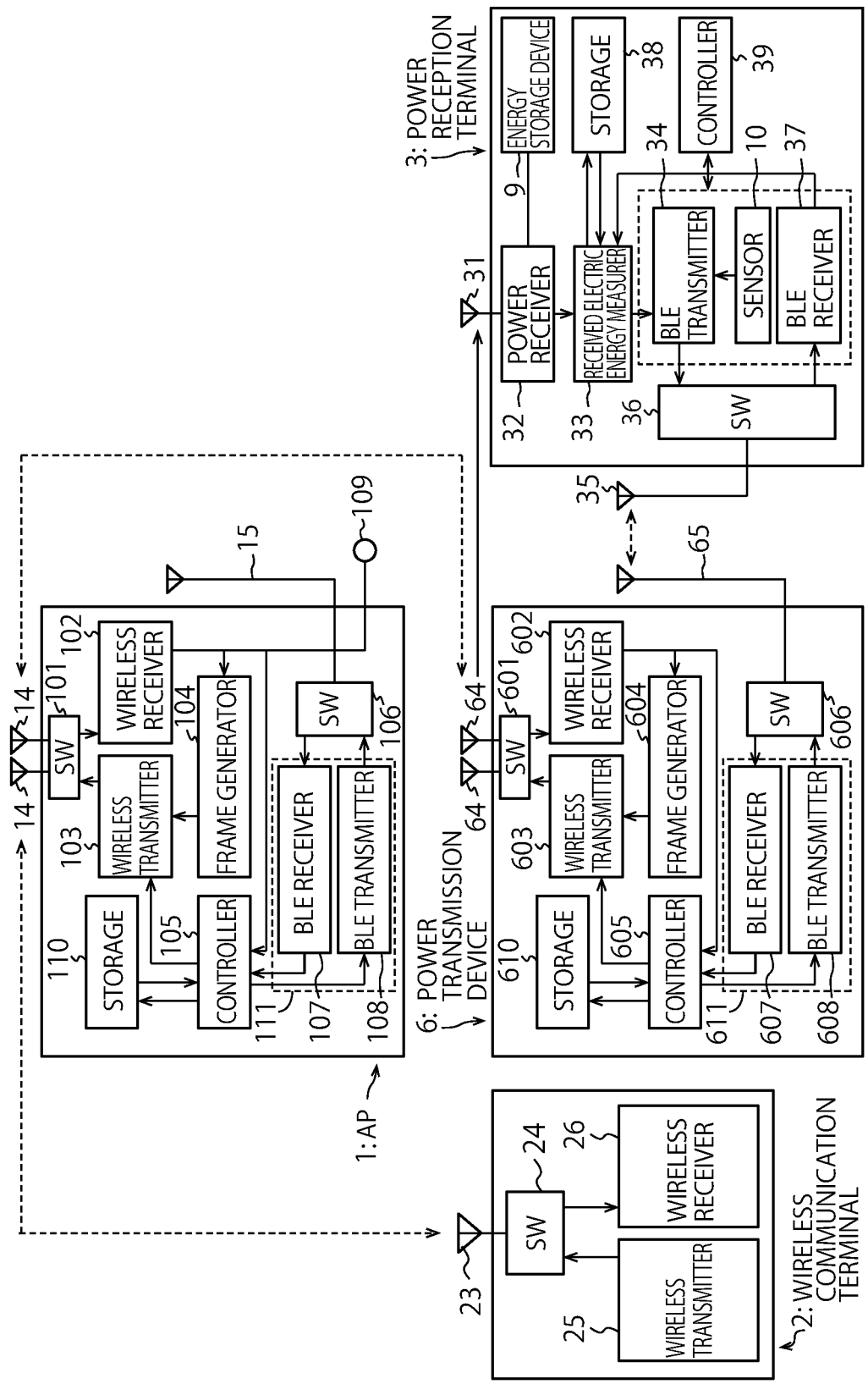
FIG. 6 is an overall block diagram of a wireless power supply system according to a first embodiment.

FIG. 6 is an overall block diagram of the wireless power supply system according to the first embodiment. For the sake of simplicity, the AP 1, the wireless communication terminal 2, the power reception terminal (which corresponds to one or more apparatuses or a second apparatus) 3 and the power transmission device 6, the numbers of which are each only one, are shown. In actuality, multiple numbers thereof may be present. The AP 1 corresponds to the AP 1A and the AP 1B in FIG. 1. The wireless communication terminal 2 corresponds to the wireless communication terminal 2A and the wireless communication terminal 2B in FIG. 1, for example. The power reception terminal 3 corresponds to the power reception terminals 3A to 3G in FIG. 1. The power transmission device 6 corresponds to the power transmission device 6 in FIG. 1. The power transmission device 6 is externally connected (wirelessly connected through the wireless LAN) to the AP 1. Alternatively, the connection may be through a wired manner. The power transmission device 6 is disposed in the AP 1 (see a second embodiment described later). In a case where the power transmission device 6 is disposed in the AP 1, signal transmission and reception between the AP 1 and the power transmission device 6 may be performed via an internal bus instead of the wireless LAN. Accordingly, the power transmission device 6 does not require the wireless LAN communication function.

(AP 1)

The AP 1 communicates with the wireless communication terminal 2 and the power transmission device 6 according to the first wireless communication scheme (here, the wireless LAN). The AP 1 communicates with the power reception terminal 3 according to the second wireless communication scheme (here, the BLE). The AP 1 wirelessly supplies the power to the power reception terminal 3. Note that in FIG. 6, the representation of the example of BLE communication of the AP 1 with the power reception terminal 3, and the example of wireless power supply to the power reception terminal 3 is omitted. It is assumed that the frequency band used for the wireless LAN is different from the frequency band used for the BLE. For example, it is assumed that the wireless LAN uses the 5.6 GHz band, and the BLE uses the 2.4 GHz band. Alternatively, the first wireless communication scheme and the second wireless communication scheme may use the same frequency band. In the case of BLE, the AP 1 or the power transmission device 6 can perform the operations of finding the power reception terminal 3 and of being connected to the power reception terminal 3 via an advertisement channel.

The wireless communication device mounted on the AP 1 includes: one or more antennas 14 shared between the wireless LAN communication and the wireless power supply; one or more antennas 15 for BLE communication; a switch 101; a wireless receiver 102; a wireless transmitter 103; a frame generator 104; a controller 105; a switch 106; a BLE communicator 111 (a BLE receiver 107 and a BLE transmitter 108); an IF 109; and a storage 110. The pair of the wireless transmitter 103 and the wireless receiver 102 corresponds to the wireless communicator, for example. Controlling circuitry according to the present embodiment includes the controller 105 as one embodiment.

An electronic apparatus in this embodiment is configured by combining the element (e.g., the controller 105) in the AP 1 with the power transmission device 6 or the element in the power transmission device 6 (e.g., a wireless transmitter 603 (power transmitter)). For example, the electronic apparatus may include the controller 105 and the wireless transmitter 603 (power transmitter), and the electronic apparatus may be connected to the wireless communicator (the wireless transmitter 103 and the wireless receiver 102). A first apparatus that includes the controller 105, and the power transmission device 6 that includes the power transmitter may be wiredly or wirelessly connected to each other. The electronic apparatus in this embodiment may have a configuration where the power transmission device is connected in the AP 1 (see the second embodiment described later). As described above, the electronic apparatus in this embodiment can be configured by freely combining elements in the AP 1 and elements in the power transmission device 6.

The number of antennas 14 may be one or more. The type and shape of the antenna are not specifically defined. In this embodiment, multiple antennas 14 are provided. Likewise, the number of antennas 15 may be one or more. The type and shape of the antenna are not specifically defined. In this embodiment, the number of antennas 15 is one.

The switch 101 is a switch for switching the antennas 14 between the wireless transmitter 103 and the wireless receiver 102. Alternatively, a configuration can be adopted where the switch 101 is not provided and the antennas 14 are connected to the wireless transmitter 103 and the wireless receiver 102.

The frame generator 104 generates a frame to be transmitted to the wireless communication terminal 2 or the power transmission device 6. In a case where the AP 1 performs wireless LAN communication, the frame is a MAC frame. The wireless LAN standard frames include a data frame, a management frame, and a control frame. The frame may be any of these frames. An example of the management frame is a beacon frame. Examples of the control frame include an RTS (Request to Send) frame for issuing a transmission request to the opposite terminal, a CTS (Clear to Send) frame for permitting transmission, and an ACK frame or a BA (Block Ack) frame that is an acknowledge frame. The frames listed here are only examples. There are other various frames.

The AP 1 transmits the beacon frame for periodically notifying the own attribute or synchronization information.

The wireless transmitter 103 transmits a frame generated by the frame generator 104, via the antennas 14. In actuality, a header on a physical layer header is added to the frame to form a packet, and the packet is transmitted. The wireless transmitter 103 error-correction-codes and modulates the frame (more specifically, the packet) to generate a modulated signal. The modulated signal is converted into an analog signal. The wireless transmitter 103 generates a signal at a constant frequency using an oscillator and a PLL (Phase Locked Loop) circuit, and causes a transmission mixer to upconvert the analog signal into a signal at a radio frequency on the basis of the generated constant frequency. The wireless transmitter 103 causes an RF amplifier to amplify the upconverted signal, and transmits the amplified signal to the air through the antennas 14. Accordingly, the frame (packet) at the radio frequency is transmitted.

Under control of the controller 105, the wireless transmitter 103 generates a wireless signal for wireless power supply (power supply signal), and transmits the wireless signal via the antennas 14. More specifically, the wireless transmitter 103 generates the wireless signal according to power supply parameters designated by the controller 105. The wireless signal can be generated using an output signal of the oscillator used for transmitting the frame or packet or an output signal of the PLL circuit. For example, the wireless signal may be generated by combining power supply data according to the power supply parameters with the output signal with the transmission mixer. Alternatively, a signal source for the wireless signal may be prepared, and the wireless signal can be generated from the power supply parameters using the signal source.

The wireless signal for power supply can be generated using the frame generated by the frame generator 104. For example, the beacon frame can be used as the wireless signal. Alternatively, a frame for wireless power supply may be defined, and the frame may be transmitted as the wireless signal.

The controller 105 controls communication with the wireless communication terminal 2 using the frame generator 104.

The controller 105 controls power supply (power transmission) that is performed by the wireless transmitter 103 or the power transmission device 6. The former corresponds to a case of power supply from the own station. The latter corresponds to a case of power supply from the power transmission device 6. According to an example of the control, the controller 105 controls power supply parameters for the wireless signal for power supply. Examples of the configuration items of the power supply parameters include weights for the respective antennas. The items also include a modulation scheme or a modulation and coding scheme (MCS). According to another example, the items include information for identifying the wireless power supply channel to be used in a case of multiple wireless power supply channels. Here, the weights are adjustment values for the amplitude and phase of the transmission signal. The amplitude and phase of the signal to be transmitted are adjusted for each antenna, and weighted combination is performed, thereby allowing various beam patterns to be formed. In an opposite manner, the signal can be received through the beam pattern by applying a reception process to the received signal on the basis of the weights. Formation of the beam pattern suitable for the power reception terminal 3 allows transmission of the wireless signal having a high power conversion efficiency (also called transmission efficiency, or power reception efficiency).

A parameter representing the combination of weights set for the individual antennas (the antennas 14 of the own station or antennas 64 of the power transmission device 6) is called a weight parameter. For example, the controller 105 selects a beam pattern to be used for power supply from the pattern table that associates the beam patterns with the weight parameters, for the wireless transmitter 103 or the power transmission device 6. FIG. 7 shows an example of the pattern table. For each of N beam patterns, the value of the corresponding weight parameter is set. For example, in a case of a beam pattern 1, the weight parameter is W1= (W1a, W1b). W1a is a weight of the first antenna. W2b is a weight for the second antenna. In a case of three or more antennas, weights for the third antenna and antennas thereafter are also included in the weight parameters. The beam pattern is not necessarily, preliminarily managed in the table as shown in FIG. 7. Instead, the pattern may be determined by adjusting the parameter according to a predefined algorithm. Alternatively, the state of the channel with the power reception terminal may be estimated by performing a sounding process with a device to be supplied with the power. On the basis of the estimated state of the channel, the beam pattern suitable for the power supply target may be determined.

In this embodiment, the beam pattern is generated (beam-formed) by adjusting the weight of the antennas 14 or the antennas 64. In a case where the antennas 14 or the antennas 64 are directional variable antennas, the antennas 14 or the antennas 64, per se, are adjusted to adjust the beam pattern. Also in this case, the operations of this embodiment can be achieved.

The controller 105 checks whether one or more beam patterns at the power transmission device 6 are time sharing patterns (patterns interfering with the wireless LAN) or space sharing patterns (having no interference or a little interference with the wireless LAN). For example, the controller 105 analyzes the signal received by multiple antennas 65 using the weight parameters corresponding to the respective beam patterns at the power transmission device 6, and checks the conditions of interference with the wireless LAN channel used by the own station (whether each beam pattern interferes with the wireless LAN channel or not) based on the analysis. That is, the conditions of interference with each beam pattern are measured for the adjacent wireless LAN channel.

For example, the average reception power value in a constant time period is measured as an indicator for identifying the conditions of interference with the wireless LAN channel. Alternatively, the indicator may be a ratio (channel occupancy rate) of a time period during which the reception power is at least a threshold in a constant time period. Alternatively, the channel state (busy or idle) may be measured, and the ratio of times in the busy state to the number of measurements (busy ratio) may be adopted as the indicator. Alternatively, the wireless LAN packet may be tried to be received on the channel, and the number of packet receptions measured in a constant time period may be adopted as the indicator. For example, if the average reception power value or the channel occupancy rate of a certain beam pattern is equal to or less than the threshold, or the number of packet receptions is zero or equal to or less than the threshold, the beam pattern is determined to interfere and is determined to be the space sharing pattern. Otherwise, the beam pattern is determined not to interfere and is determined to be the time sharing pattern.

In this embodiment, the AP 1 measures the interference with the wireless LAN channel of the own station. Alternatively, this AP 1 may measure the interference with the wireless LAN channel used by another AP 1 (another wireless communication device that executes the first wireless communication scheme). In this case, the AP 1 may perform inter-base-station communication with the other AP 1, and allow the other AP 1 to set the aforementioned transmission prohibited period (NAV period).

According to a freely selected predetermined method, the controller 105 selects the beam pattern as the beam pattern to be used by the power transmission device 6 for the power reception terminal 3 that is the power supply target. For example, the beam pattern allowing the most efficient power supply is selected. For example, wireless power supply is experimentally performed for each of the beam patterns at the power transmission device 6. Received electric energy information (described later in detail) is obtained as feedback from the power reception terminal 3 directly or via the power transmission device 6. A beam pattern having the received electric energy information that is the highest or equal to or more than a threshold is selected. According to other methods, for example, the pattern may be randomly selected, or selected in a certain sequence. Here, the beam pattern selection does not necessarily discriminate the space sharing pattern and the time sharing pattern from each other, and the pattern may be selected from among all the beam patterns. Alternatively, the multiple beam patterns may be classified into the space sharing patterns and the time sharing patterns, and a method of selecting the beam pattern from among the space sharing patterns or a method of selecting the beam pattern from among the time sharing patterns can be adopted. Also in a case where the wireless transmitter 103 selects the beam pattern to be used for the power reception terminal 3 that is the power supply target, any method may be adopted. This method may be selection of the beam pattern allowing the most efficient power supply, for example.

In a case where the power is supplied through the time sharing pattern (first beam pattern), the controller 105 sets the power supply period (first power supply period) on a condition that overlapping with the period of communication on the wireless LAN (first wireless communication scheme) is prohibited. In a case of power supply through the space sharing pattern (second beam pattern), the power supply period (second power supply period) is set on a condition that at least partial overlapping with the first communication period is allowed. The power transmission device 6 supplies the power in the power supply period set by the controller 105.

The wireless receiver 102 demodulates the wireless LAN signal received from the wireless communication terminal 2 or the power transmission device 6, and obtains the frame. More specifically, the wireless receiver 102 causes an LNA (Low Noise Amplifier) amplifier to amplify the signal received by the antennas 14. The wireless receiver 102 extracts the signal in a desired band from the amplified signal using a reception filter. The wireless receiver 102 downconverts the extracted signal, on the basis of a signal that is generated by the oscillator and the PLL circuit and is at a predetermined frequency. The wireless receiver 102 obtains the frame through demodulation and decoding.

If the obtained frame is the data frame, the wireless receiver 102 outputs the data included in the data frame from the IF 109. The IF 109 is an interface for outputting the frame received by the wireless receiver 102 to an upper layer or a buffer with the upper layer. The wireless receiver 102 outputs the frame analysis result to the frame generator 104 or the controller 105 so as to perform operations according to the type of the received frame. For example, to issue an acknowledge response, information required for the acknowledge response is output to both the frame generator 104 and the controller 105. A constant time period after completion of reception, the acknowledge response frame is transmitted.

The switch 106 is a switch for switching the antenna 15 to the BLE receiver 107 or the BLE transmitter 108.

The BLE receiver 107 receives a BLE signal. The BLE receiver 107 receives data from the power reception terminal 3 through the BLE antenna 15. Examples of received data include a power supply request, sensor data, and information pertaining to the electric energy received by the power reception terminal 3 (received electric energy information).

The BLE receiver 107 is connected to the controller 105, and supplies the controller 105 with the power supply request received from the power reception terminal 3 and the received electric energy information. The BLE receiver 107 transmits sensor data received from the power reception terminal 3, to a server (monitor device), not shown. The monitor device confirms the presence or absence of abnormality at a sensing site on the basis of the sensor data. The controller 105 may also play the role of the monitor device. In this case, the BLE receiver 107 supplies the sensor data to the controller 105.

The BLE transmitter 108 is connected to the controller 105, and transmits data designated by the controller 105 to the power reception terminal 3 via the antenna 15. Examples of data to be transmitted include the power supply parameters (the weight of each antenna used for transmitting the wireless signal from the AP 1 or the power transmission device 6, the transmission power, etc.), and measurement instruction information on the received electric energy. The power reception terminal 3 efficiently receives the wireless signal (power supply signal) using the notified weight of each antenna.

The storage 110 is connected to the controller 105, and stores control data. The storage 110 may be a volatile memory, such as SRAM or DRAM, or a nonvolatile memory, such as NAND, MRAM or FRAM. Alternatively, this storage may be a storage device, such as a hard disk or SSD.

(Wireless Communication Terminal)

The wireless communication terminal 2 communicates with the AP 1 according to the first wireless communication scheme (here, the wireless LAN). The wireless communication terminal 2 is sometimes called a station (STA). The wireless communication scheme used by the wireless communication terminal 2 may be any scheme only if the scheme conforms to a wireless communication scheme that is identical to or compatible with the wireless communication scheme used by the AP 1.

The wireless communication device mounted on the wireless communication terminal 2 includes an antenna 23, a switch 24, a wireless transmitter 25, and a wireless receiver 26. The switch 24 is a switch for switching the connection destination of the antenna 23 between the wireless transmitter 25 and the wireless receiver 26. The wireless transmitter 25 transmits a frame generated by the wireless communication terminal 2, via the antennas 23. The wireless receiver 26 receives the frame from the AP 1 and another wireless communication terminal.

The antenna 23 is an antenna that can transmit and receive a wireless LAN signal. The number of antennas 23 may be one or more. The type and shape of the antenna are not specifically defined. The wireless transmitter 25 and the wireless receiver 26 have functions analogous to the functions of the wireless transmitter 103 and the wireless receiver 102 of the AP 1 that pertain to the wireless LAN.

(Power Transmission Device)

The power transmission device 6 communicates with the AP 1 according to the first wireless communication scheme (here, the wireless LAN). The power transmission device 6 communicates with the power reception terminal 3 according to the second wireless communication scheme (here, the BLE). The power transmission device 6 wirelessly supplies the power to the power reception terminal 3. However, the power transmission device 6 does not necessarily communicate with the power reception terminal 3 according to the second wireless communication scheme. In this case, the power transmission device 6 is not required to have a function of executing the second wireless communication scheme. In a case where the power transmission device 6 is wiredly connected to the AP 1 or is mounted in the AP 1, the function pertaining to the wireless LAN is not required. In the following description, the description of functions analogous those of the AP 1 is appropriately omitted.

The power transmission device 6 includes: one or more antennas 64 for wireless communication or wireless power supply; one or more antennas 65 for BLE; a switch 601; a wireless receiver 602; a wireless transmitter 603; a frame generator 604; a controller 605; a switch 606; a BLE communicator 611 (a BLE receiver 607 and a BLE transmitter 608); and a storage 610. Controlling circuitry according to the embodiment includes the controller 605 as one example.

The number of antennas 64 may be one or more. The type and shape of the antenna are not specifically defined. In this embodiment, multiple antennas 64 are provided. Likewise, the number of antennas 65 may be one or more. The type and shape of the antenna are not specifically defined. In this embodiment, the number of antennas 65 is one.

The switch 601 is a switch for switching the antennas 64 between the wireless transmitter 603 and the wireless receiver 602. Alternatively, a configuration can be adopted where the switch 601 is not provided and the antennas 64 are connected to the wireless transmitter 603 and the wireless receiver 602.

The frame generator 604 generates a frame to be transmitted to the AP 1. In a case where the AP 1 performs wireless LAN communication, the frame is a MAC frame.

The wireless transmitter 603 transmits a frame generated by the frame generator 604, via the antennas 64.

Under control of the controller 605, the wireless transmitter 603 generates a wireless signal for wireless power supply (power supply signal), and transmits the wireless signal via the antennas 64. Consequently, the wireless transmitter 603 functions as a power transmitter in the power transmission device 6. More specifically, the wireless transmitter 603 generates the wireless signal according to power supply parameters (the weights of the antennas etc.) designated by the controller 605. The wireless signal can be generated using an output signal of the oscillator used for transmitting the frame or packet or an output signal of the PLL circuit. For example, the wireless signal may be generated by combining power supply data according to the power supply parameters with the output signal with a transmission mixer. Alternatively, a signal source for the wireless signal may be prepared, and the wireless signal can be generated from the power supply parameters using the signal source. Alternatively, the wireless signal for power supply can be generated using the frame generated by the frame generator 604. For example, a frame for wireless power supply may be defined, and the frame may be transmitted as a wireless signal.

The controller 605 controls communication with the AP 1 using the frame generator 604.

The controller 605 performs control pertaining to wireless power supply to the power reception terminal 3. For example, the controller 605 may control power supply parameters for the wireless signal to be transmitted by the wireless transmitter 603. In this case, as with the case of the AP 1, a pattern table that associates the beam pattern with the weight parameters may be held in the storage 610. The controller 605 checks whether one or more beam patterns are time sharing patterns or space sharing patterns, by measuring the conditions of using the adjacent wireless LAN channel. The controller 605 may select the beam pattern to be used for the power reception terminal 3 that is the power supply target. According to a method analogous to that of the controller 105, the controller 605 may set the power supply period (first power supply period) in a case of power supply according to the time sharing pattern, and the power supply period (second power supply period) in a case of power supply according to the space sharing pattern. The entire or a part of the operation of the control pertaining to the wireless power supply described here may be performed by the AP 1 as described above. In this case, the controller 605 is not required to perform the entire or a part of the control. On the contrary, in a case where the entire or a part of the control is performed by the power transmission device 6, the AP 1 is not required to perform the entire or a part of the control.

The wireless receiver 602 demodulates the signal received from the AP 1, and obtains the frame. The wireless receiver 602 analyzes the obtained frame, and outputs the frame analysis result to the frame generator 604 or the controller 605.

The switch 606 is a switch for switching the antenna 65 to the BLE receiver 607 or the BLE transmitter 608.

The BLE receiver 607 receives a BLE signal from the power reception terminal 3. The BLE receiver 607 receives data from the power reception terminal 3 through the BLE antenna 65. Examples of received data include a power supply request, sensor data, and information pertaining to the electric energy received by the power reception terminal 3 (received electric energy information).

The BLE receiver 607 is connected to the controller 605. Upon receipt of the power supply request and the received electric energy information from the power reception terminal 3, the BLE receiver 607 may supply the request and information to the controller 605. The controller 605 may transmit, to the AP 1, the supplied request and information, which may be interpreted by the controller 605 instead and subsequent control may be performed. Upon receipt of the sensor data from the power reception terminal 3, the BLE receiver 607 may transmit the received sensor data to a server (monitor device), not shown. The controller 605 may also play the role of the monitor device. In this case, the BLE receiver 607 supplies the sensor data to the controller 605.

The BLE transmitter 608 is connected to the controller 605, and transmits data designated by the controller 605 to the power reception terminal 3 via the antenna 65. Examples of the data to be transmitted include power supply parameters, and measurement instruction information on the received electric energy. In a case where the power transmission device 6 does not include the BLE communication function, the AP 1 may communicate with the power reception terminal 3 that the power transmission device 6 regards as the power supply target.

(Power Reception Terminal)

The power reception terminal 3 is a device that can perform the BLE communication with at least one of the AP 1 and the power transmission device 6, and can wirelessly supplied with power from the AP 1 or the power transmission device 6.

The wireless communication device mounted on the power reception terminal 3 includes: a sensor 10; an antenna 31 for wireless LAN; a power receiver 32; a received electric energy measurer 33; a BLE transmitter 34; an antenna 35 for BLE; a switch 36; a BLE receiver 37; a storage 38; a controller 39; and an energy storage device 9. The numbers of antennas 31 and antennas 35 may each be one or more. The antenna 35 may be a shared antenna for wireless power supply and BLE communication, and the antenna 31 may be omitted. In this case, the antenna 35 is connected to the power receiver 32 directly or via the switch 36.

The energy storage device 9 is a device that can accumulate and release power (charges). The energy storage device 9 may be a small storage battery such as lithium-ion battery, or a secondary battery, or a capacitor. In this embodiment, a storage battery is assumed as the energy storage device 9, which is hereinafter described as a storage battery 9. The power reception terminal 3 operates by the power accumulated in the storage battery 9. The AP 1 and the wireless communication terminal 2 operate based on the power supplied from a battery or an external power source (a commercial power source, battery, etc.) mounted on the own device.

The power receiver 32 receives, via the antenna 31, the wireless signal (power supply signal) transmitted from the AP 1 or the power transmission device 6, and converts (rectifies) the received wireless signal into direct current. The power receiver 32 accumulates the converted direct current in the storage battery 9.

The received electric energy measurer 33 measures the electric energy (received electric energy) of the received wireless signal. The method of measuring the received electric energy may be any method. For example, the received electric energy may be obtained according to variation in voltage before and after measurement. Specifically, the received electric energy is measured from the difference of voltages before and after the measurement and the battery capacity. Information pertaining to the measured, received electric energy is stored in the storage 38.

The BLE transmitter 34 transmits the BLE signal to at least one of the AP 1 and the power transmission device 6. For example, the BLE transmitter 34 transmits the information pertaining to the measured, received electric energy (received electric energy information) via the antenna 35 for BLE. The received electric energy information includes, for example, a value of identifying the measured, received electric energy. The value for identifying the received electric energy may be the value of the received electric energy, or a value of variation in voltages in the storage battery 9 before and after the measurement. In a case where the characteristics of the storage battery 9 can be grasped by the AP 1 or the power transmission device 6, the received electric energy can be calculated by the AP 1 or the power transmission device 6 from the value of variation in voltages.

The received electric energy information may be the power conversion efficiency. The power conversion efficiency can be calculated as the ratio between the reception power value (or the received electric energy) and the transmission power value (or the transmission electric energy) by the received electric energy measurer 33 or the controller 39. It is assumed that the transmission power value (or the transmission electric energy) is preliminarily notified from the AP 1 or the power transmission device 6, or the own device preliminarily designates the transmission power value (or the transmission electric energy) by a power supply request. Alternatively, it may be assumed that the transmission power value (transmission electric energy) is predetermined by the system or specifications. The average reception power or the maximum reception power value may be used as the reception power value. The average transmission power value or the maximum transmission power value may be used as the transmission power value.

The switch 36 is a switch for switching the connection destination of the antenna 35 between the BLE transmitter 34 and the BLE receiver 37.

The BLE receiver 37 receives a BLE signal from the AP 1 or the power transmission device 6. For example, the BLE receiver 37 receives data from the AP 1 or the power transmission device 6 through the BLE antenna 35. An example of the received data may be any one of the power supply parameters and the measurement instruction information.

The storage 38 stores the received electric energy information measured by the received electric energy measurer 33, or any data item. The storage 38 may be a volatile memory, such as SRAM or DRAM, a nonvolatile memory, such as NAND, MRAM or FRAM, a storage device, such as a hard disk or SSD, or a combination thereof.

The sensor 10 is any sensor, such as a tire air pressure sensor, an engine temperature sensor, an indoor temperature sensor, a direction sensor, a motion sensor, or a distance sensor, for example.

The controller 39 controls the received electric energy measurer 33, the BLE transmitter 34, the BLE receiver 37, and the sensor 10. The controller 39 may transmit a power supply request to at least one of the AP 1 and the power transmission device 6 via the BLE transmitter 34. The power supply request includes, for example, setting values of the electric energy (power supply amount) required to be supplied from the AP 1 or the power transmission device 6, the power supply period, the number of transmissions of the wireless signal, the length of the wireless signal per transmission, the transmission power value or the like, or any combination thereof. The AP 1 may generate a power supply schedule on the basis of the power supply request. However, if any of the setting values is predetermined by the system or specifications, the setting value is not required to be included in the power supply request. The setting value described above may be transmitted separately from the power supply request. The transmission timing of the power supply request may be any timing. The timing is, for example, timing when the remaining electric energy of the storage battery 9 becomes equal to or less than the threshold, or timing when a predetermined time is reached. However, the timing is not limited thereto.

The controller 39 may transmit (feeds back) the received electric energy information pertaining to an electric energy (received electric energy) supplied from the AP 1 or the power transmission device 6, to the AP 1 or the power transmission device 6 via the BLE transmitter 34.

(System Operation Example)

Figure 8A:
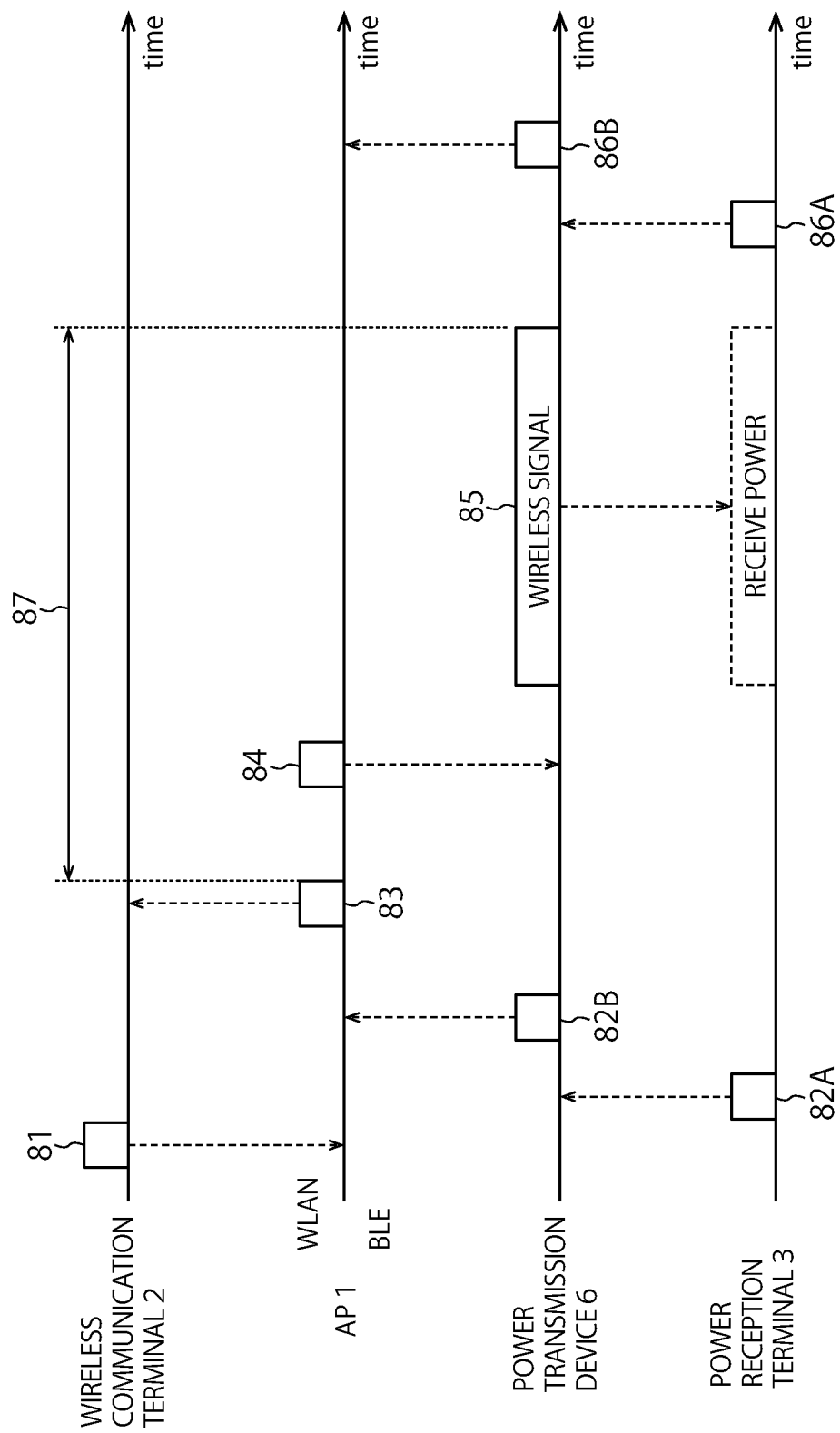
FIG. 8A is an operation sequence diagram of the system in FIG. 6.
Figure 8B:
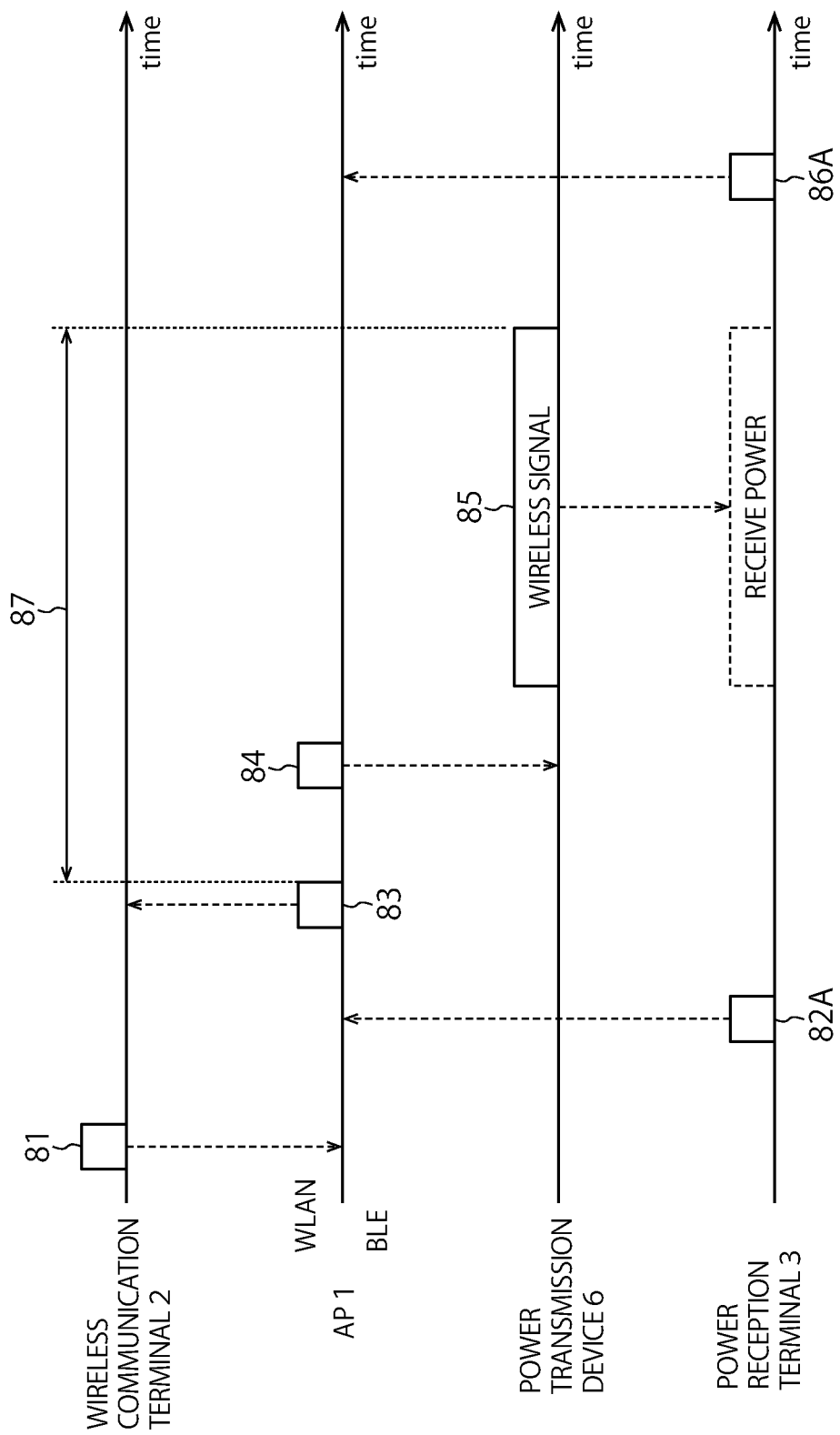
FIG. 8B is an operation sequence diagram of the system in FIG. 6.

Referring to FIGS. 8A and 8B, an operation example of the system in FIG. 6 is described. Here, for example, the wireless communication terminal 2 is a monitoring camera in a factory, and the power reception terminal 3 is a BLE terminal.

FIG. 8A shows an operation sequence example of the system in FIG. 6. In FIG. 8A, the AP 1 receives video data 81 from the wireless communication terminal 2 according to the first wireless communication scheme periodically or at any timing. The AP 1 stores the received video data in the storage device, and transmits the data to a surveillance monitor (display device), not shown, or transmits the data to a server, not shown. The server may execute image analysis.

The AP 1 receives, via the power transmission device 6, data that includes information representing the state of the power reception terminal 3 (e.g., the remaining electric energy of the storage battery, and received electric energy information) or a power supply request, for example. That is, the power transmission device 6 receives, from the power reception terminal 3, data 82A that includes information representing the state of the power reception terminal 3 or the power supply request, and transmits the received data 82A as data 82B to the AP 1. The AP 1 identifies the power reception terminal 3 serving as the power supply target, and the power supply condition (the power supply amount, power supply time period, transmission power, etc.) on the basis of the obtained data 82B.

The AP 1 determines the power supply beam pattern (the weights of multiple antennas 64) at the power transmission device 6. The AP 1 determines whether the determined beam pattern is the space sharing pattern or the time sharing pattern on the basis of a preliminarily performed measurement result. At least one of a function of determining the beam pattern, and a function of determining whether the determined beam pattern is the space sharing pattern or the time sharing pattern may be in the power transmission device 6. In this case, the AP 1 may transmit information required to execute each function, to the power transmission device 6. The power transmission device 6 may transmit, to the AP 1, information required for processes thereafter in the AP 1 according to an execution result of the function. For example, in a case where the power transmission device 6 determines the beam pattern, information identifying the determined beam pattern may be transmitted to the AP 1. In a case where the power transmission device 6 determines whether the pattern is the space sharing pattern or the time sharing pattern, information identifying the determined pattern may be transmitted to the AP 1.

In a case where the determined pattern is the time sharing pattern, the AP 1 transmits a frame (e.g., "CTS-to-self" frame) 83 that designates a period having a length equal to or more than the power supply period, and secures a wireless LAN channel use period 87. During the use period 87, the wireless communication terminal 2 is prohibited from transmission. The AP 1 transmits, to the power transmission device 6, beam pattern information, information on the power reception terminal 3 that is the power supply target, and data 84 representing the power supply condition etc. The power transmission device 6 forms the beam pattern on the basis of the information on the received beam pattern, and transmits the wireless signal 85 for power supply, according to the power supply condition. Accordingly, the wireless power supply is performed. The data 84 may be transmitted before the frame 83 is transmitted.

A case where the determined pattern is the space sharing pattern is different from the case of the time sharing pattern only in that the frame 83 is not required to be transmitted, and is analogous thereto except the difference. That is, the AP 1 transmits, to the power transmission device 6, information on the determined beam pattern, information on the power reception terminal 3 that is the power supply target, and data 84 representing the power supply condition etc. The power transmission device 6 forms the beam pattern on the basis of the information on the received beam pattern, and transmits the wireless signal 85, according to the power supply condition.

The power reception terminal 3 receives the wireless signal 85 through the beam pattern described above from the power transmission device 6, and charges the storage battery 9 with the power of the received wireless signal 85. After the power reception, the power reception terminal 3 transmits, to the power transmission device 6, the received electric energy information as a completion report. That is, the power transmission device 6 receives received electric energy information 86A from the power reception terminal 3, and transmits the information as received electric energy information 86B to the AP 1. The power reception terminal 3 may transmit the received electric energy information immediately after the power reception, and may transmit a request for notifying insufficiency only in a case where the received electric energy is insufficient as the received electric energy information. The AP 1 may determine the beam pattern to be used next for the power reception terminal 3, using the received electric energy information 86B received. For example, the power reception efficiency is identified from the received electric energy information. If the power reception efficiency is less than a threshold, another beam pattern is determined to be selected. If the efficiency is equal to or more than the threshold, the same beam pattern is determined to be continuously used. Alternatively, the received electric energy information may be used to change the wireless power supply channel to be used for power supply. A part of the operation of the AP 1 described above may be performed by the power transmission device 6.

In a case where the power transmission device 6 does not have the BLE communication function, a configuration may be adopted where instead of the power transmission device 6, the AP 1 communicates with the power reception terminal 3 serving as the power supply target of the power transmission device 6. FIG. 8B shows a sequence in this case. The data 82A and the received electric energy information 86A from the power reception terminal 3 are transmitted directly to the AP 1 without intervention of the power transmission device 6. The other parts of operation are the same as that of the sequence in FIG. 8A.

Hereinafter, specific operation examples where the AP 1 wirelessly supplies power using the power transmission device 6 are described as first to third operation examples with reference to flowcharts.

First Operation Example

Figure 9:
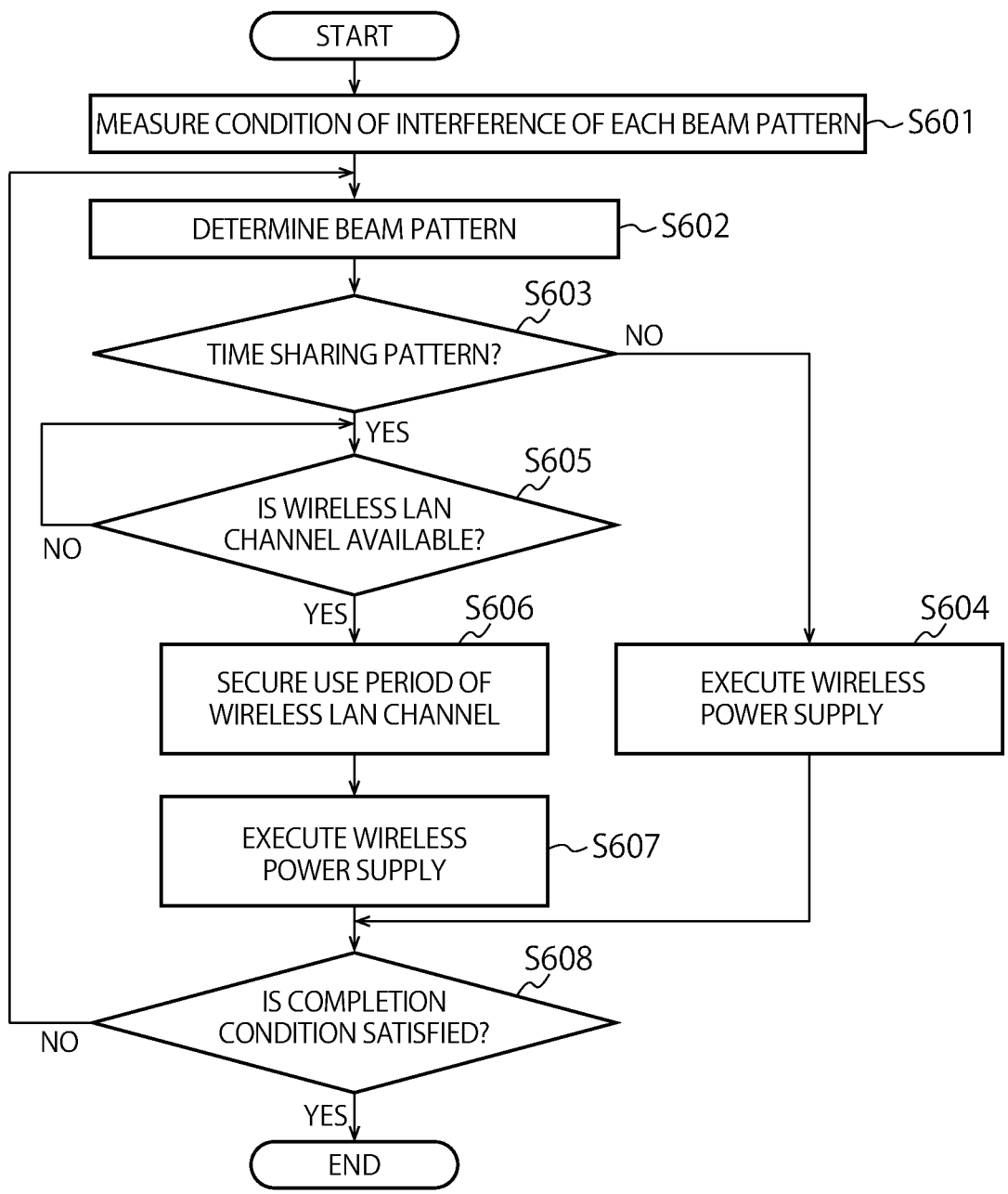
FIG. 9 is a flowchart of a first operation example where an access point performs wireless power supply using the power transmission device.

FIG. 9 is a flowchart of the first operation example where the AP 1 performs wireless power supply using the power transmission device 6. It is assumed that the AP 1 predetermined the power reception terminal 3 serving as the power supply target. For example, the AP 1 may determine the power reception terminal 3 that is the power supply target, on the basis of the identifier of the power reception terminal 3 designated by an operation terminal of the administrator. Alternatively, the power reception terminal 3 that is the power supply target may be determined through communication according to the second wireless communication scheme via the power reception terminal 3 and the power transmission device 6 or directly. In this case, for example, the power reception terminal 3 where the remaining amount of the storage battery is equal to or less than the threshold, or the power reception terminal 3 having issued a power supply request may be regarded as the power reception terminal 3 that is the power supply target. Alternatively, the power reception terminal 3 detected by a sensor or the like may be regarded as the power reception terminal 3 that is the power supply target (in this case, the power reception terminal 3 does not necessarily have the function of communication according to the second wireless communication scheme). The number of power reception terminals 3 serving as targets supplied with power at the same time may be one or more. Hereinafter, a case of one power reception terminal 3 is exemplified, and the first operation example is described.

In step S601, for the wireless LAN channel used by the own station, the AP 1 measures the conditions of interference of one or more preliminarily provided beam patterns at the power transmission device 6. Based on a result of the measurement, it is determined whether each of the one or more beam patterns is the time sharing pattern or the space sharing pattern. That is, the one or more beam patterns are classified into the time sharing pattern and the space sharing pattern. The AP 1 stores a result of classification in the storage 110.

In step S602, the AP 1 selects the beam pattern to be used by the power transmission device 6. Various methods of selecting the beam pattern can be adopted. For example, in a case where the power reception terminal 3 serving as the power supply target is fixed at a predetermined position, one or more beam patterns may be preliminarily identified by measurement in a descending order of the power transmission efficiency (power reception efficiency) for the power reception terminal 3, and information on the identified beam patterns may be stored in a table. The beam pattern having the highest power transmission efficiency is then selected from the table. In this case, the beam patterns may be measured at the start of the operation of this flowchart. According to another example of selecting the beam patterns, in a case where the power reception terminal 3 moves on a predetermined path (for example, moves on a belt conveyor), the beam patterns may be selected according to a predetermined order so as to track the power reception terminal 3. According to still another example, in a case where the position of the power reception terminal 3 cannot be identified or is difficult to be identified, or a case where the beam pattern suitable for the power reception terminal 3 is unknown, the beam pattern may be randomly selected.

In step S603, the AP 1 confirms whether the selected beam pattern is the time sharing pattern or not on the basis of the classification result in step S601. If the selected beam pattern is not the time sharing pattern (NO in S603), that is, if the selected beam pattern is the space sharing pattern, the power transmission device 6 is caused to supply power wirelessly to the power reception terminal 3 according to the selected beam pattern (S604).

The wirelessly supplied electric energy (power supply amount) may be a predefined electric energy, or an electric energy predetermined by communication (BLE etc.) with the power reception terminal 3. Alternatively, when a power supply request designating the electric energy preliminarily issued by the power reception terminal 3 is received by the AP 1 or the power transmission device 6, the designated electric energy may be regarded as the power supply amount. The power supply amount may be determined by another method. Determination of the power supply amount, in turn, determines the power supply period required for power supply (the first power supply period in the case of power supply through the time sharing pattern or the second power supply period in the case of power supply through the space sharing pattern) on the basis of the transmission power and the power reception efficiency. A power supply schedule of supplying power to one power reception terminal multiple times in a divided manner, may be generated. After execution of wireless power supply by the power transmission device 6, the AP 1 receives a completion report from the power transmission device 6. The processing proceeds to step S608.

If the selected beam pattern is the time sharing pattern (YES in S603), the AP 1 measures the availability condition (use condition) of the wireless LAN channel of the own station in step S605. For example, if the average reception power value in a constant time period is equal to or less than a threshold, it is determined that the wireless LAN channel is available. According to another example, the channel availability condition may be determined using a method analogous to that of the beam pattern interference measurement described above. If it is determined that the wireless LAN channel is unavailable (NO in S605), it is waited until the wireless LAN channel becomes available. If it is determined that the wireless LAN channel is available (YES in S605), the wireless LAN channel use period is secured (S606). For example, the AP 1 performs carrier sensing according to a wireless LAN backoff algorithm. When the channel state is idle, the AP 1 obtains a channel access right, and transmits a frame for securing the wireless LAN channel use period (here, the frame is assumed as the "CTS-to-self"). The wireless communication terminal 2 having received the "CTS-to-self" frame is prevented from transmission during the period (NAV period) designated by the "CTS-to-self" frame. Accordingly, even if power is wirelessly supplied from the power transmission device 6 in the NAV period, interference with the wireless LAN is suppressed.

After transmission of the "CTS-to-self" frame, the AP 1 causes the power transmission device 6 to supply power wirelessly to the power reception terminal 3 according to the selected beam pattern during the period secured on the wireless LAN channel (S607). The details of step S607 are analogous to those of step S604 described above. After execution of wireless power supply by the power transmission device 6, the AP 1 receives a completion report from the power transmission device 6. The processing proceeds to step S608.

In step S608, it is determined whether a completion condition is satisfied or not. For example, if power transmission to the power reception terminal 3 with a preliminarily scheduled power supply amount is completed (power transmission in the first power supply period or the second power supply period is completed), it is determined that the completion condition is satisfied. Alternatively, if a notification about completion of charging is received from the power reception terminal 3, it may be determined that the completion condition is satisfied. Alternatively, if an operation completion instruction is received from the operation terminal of the administrator, it may be determined that the completion condition is satisfied. The determination may be made according to a method other than the methods described here. If it is determined that the completion condition is not satisfied (NO in step S608), the processing returns to step S602. If it is determined that the completion condition is satisfied (YES in step S608), the operation is finished. The process in step S601 is not necessarily performed every time this flowchart is started. If it is determined NO in step S608, the processing may return to step S601.

Second Operation Example

Figure 10:
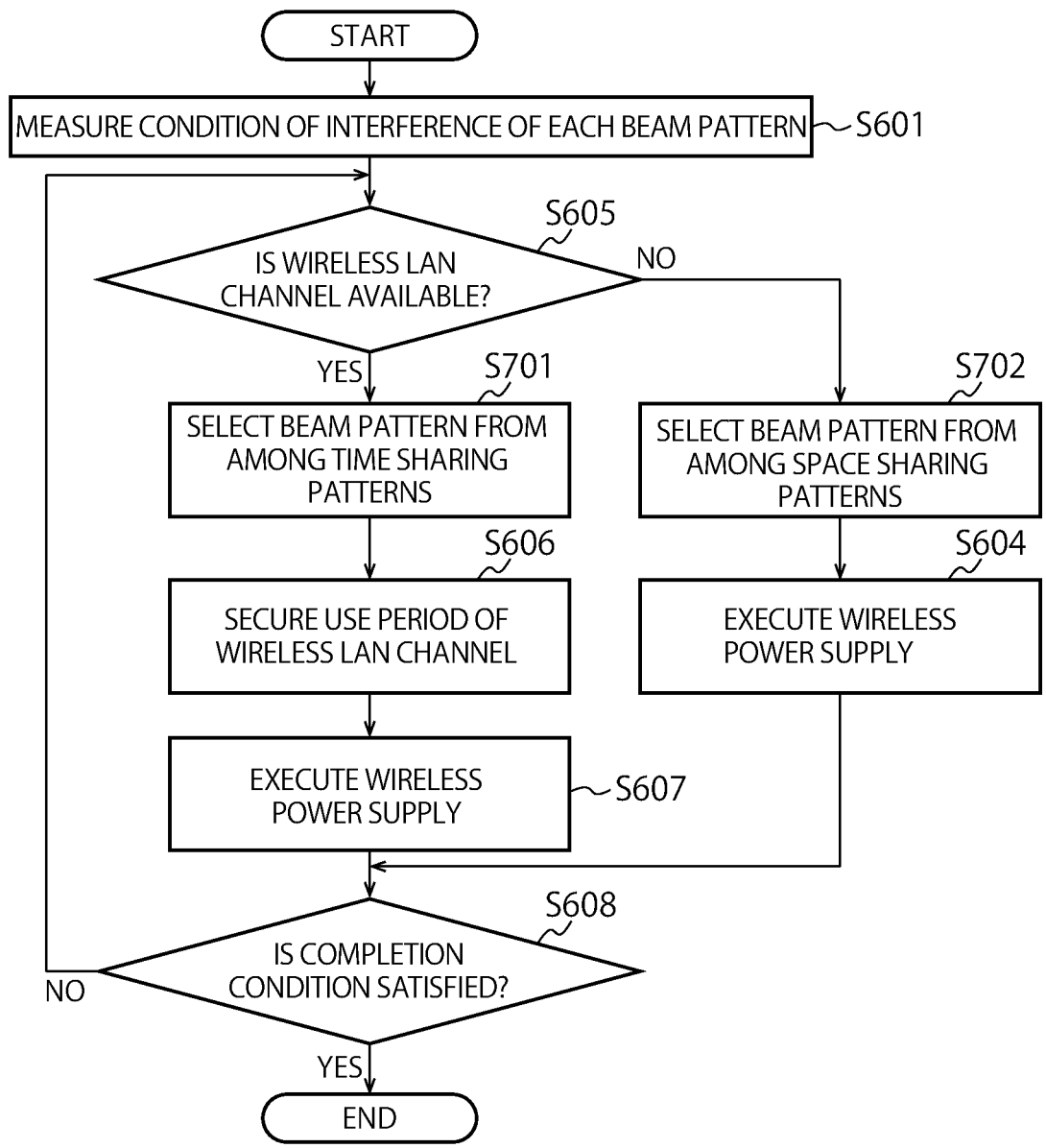
FIG. 10 is a flowchart of a second operation example where an access point performs wireless power supply using the power transmission device.

FIG. 10 is a flowchart of the second operation example where the AP 1 performs wireless power supply using the power transmission device 6. Steps having processes analogous to those in FIG. 9 are assigned the same symbols. The description thereof is appropriately omitted. This second operation example is characterized in that the beam pattern is selected from among the time sharing patterns if it is determined that the wireless LAN channel is available, and the beam pattern is selected from among the space sharing patterns if it is determined that the channel is unavailable. Preferential use of the time sharing pattern causes the range of the beam of the wireless power supply channel to be close to the coverage of the AP 1. Accordingly, when another wireless communication system uses a frequency band overlapping the wireless power supply channel, interference with the other wireless communication system can be suppressed. Hereinafter, this second operation example is described in detail.

In step S601, for the wireless LAN channel used by the AP 1 itself, the AP 1 checks whether each of one or more beam patterns at the power transmission device 6 is the time sharing pattern or the space sharing pattern. That is, the one or more beam patterns are classified into the time sharing pattern and the space sharing pattern.

In step S605, the AP 1 checks the availability condition of the wireless LAN channel (use condition), through measurement, if the AP 1 determines that the wireless LAN channel is available, the processing proceeds to step S701. If the AP 1 determines that the channel is unavailable, the processing proceeds to step S702.

In step S701, the AP 1 selects the beam pattern from among the time sharing patterns classified in step S601. In subsequent step S606, the AP 1 obtains the access right of a wireless medium through a backoff algorithm and carrier sensing of the wireless LAN, and transmits a frame designating the wireless LAN channel use period (here, the frame is assumed as the "CTS-to-self"). During the secured period, the AP 1 causes the power transmission device 6 to supply power wirelessly to the power reception terminal 3 according to the selected beam pattern (S607). Subsequently, the processing proceeds to step S608.

On the other hand in step S702, the AP 1 selects the beam pattern from among the space sharing patterns classified in step S601. The AP 1 causes the power transmission device 6 to supply power wirelessly to the power reception terminal 3 according to the selected beam pattern (S604). Subsequently, the processing proceeds to step S608.

In step S608, it is determined whether the operation of this flowchart is finished or not. If it is determined that this operation is not finished (NO in step S608), the processing returns to step S602. If it is determined that this operation is finished (YES in step S608), the operation is finished.

Third Operation Example

Figure 11:
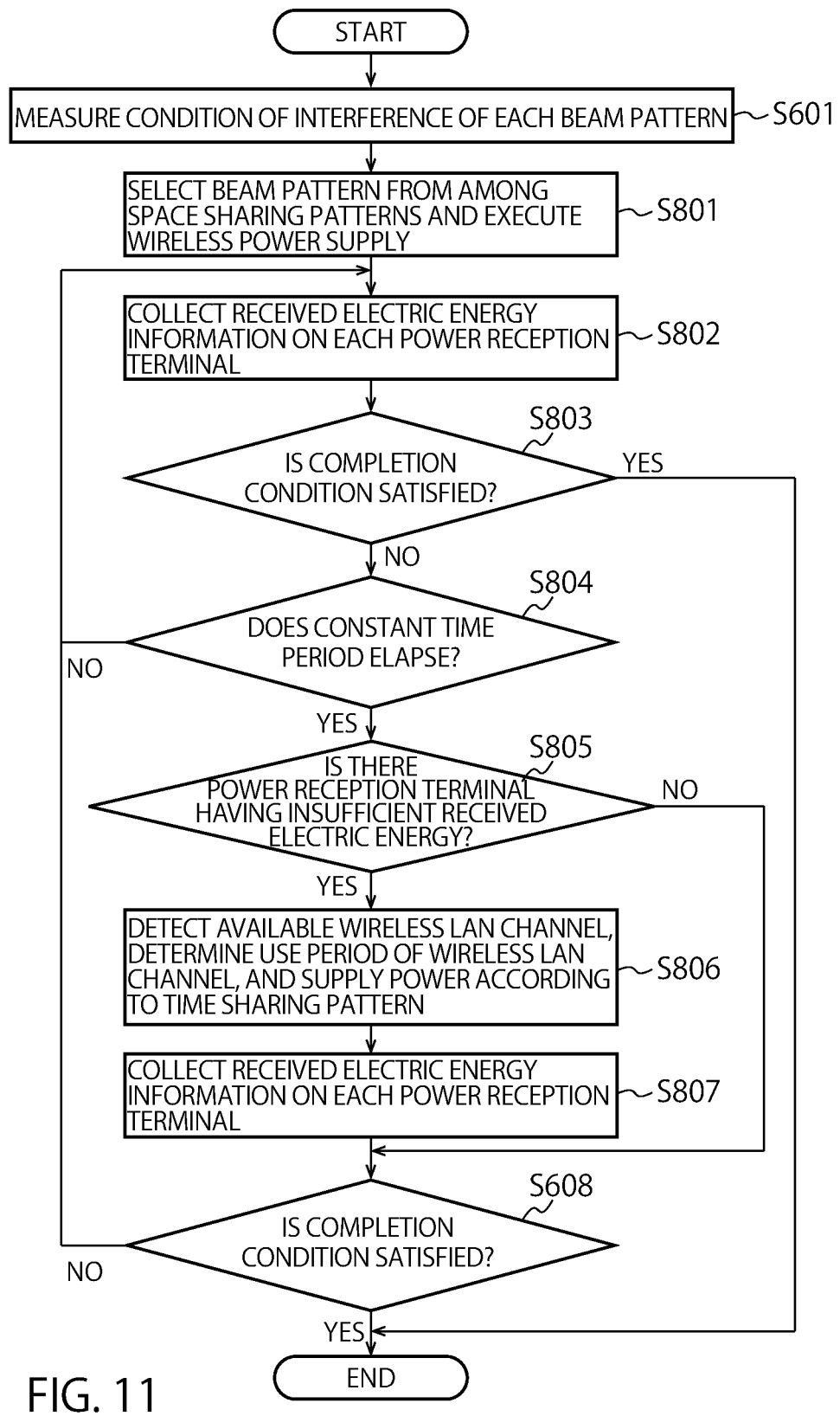
FIG. 11 is a flowchart of a third operation example where an access point performs wireless power supply using the power transmission device.

FIG. 11 is a flowchart of the third operation example where the AP 1 performs wireless power supply using the power transmission device 6. Steps having the same processes as those in FIG. 9 are assigned the same symbols. The description thereof is appropriately omitted. This third operation example is characterized in that if the beam pattern is selected from among the space sharing patterns and wireless power supply is executed but the sufficient electric energy is not supplied to the power reception terminal even after lapse of a constant time period, the beam pattern is temporarily switched to that selected from among the time sharing patterns.

That is, if a sufficient electric energy is not supplied to the power reception terminal even after lapse of the constant time period, there is a high possibility that the beam pattern selected from among the space sharing patterns is not suitable for the power reception terminal 3. It is expected to make up for insufficiency in power supply amount by switching to the beam pattern selected from among the time sharing pattern. Accordingly, power can be wirelessly supplied without reducing the use efficiency of the wireless LAN communication as much as possible. The flowcharts in FIGS. 9 and 10 exemplify the case of one power reception terminal serving as the power supply target. Alternatively, the operation of this flowchart exemplifies a case of multiple power reception terminals serving as the power supply targets.

Figure 12:
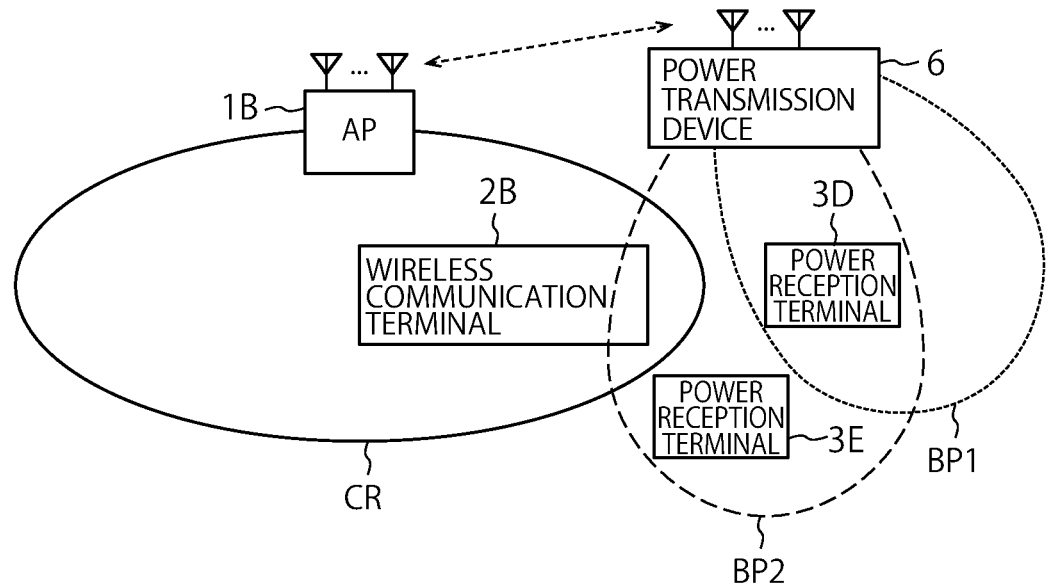
FIG. 12 shows an example of simultaneous wireless power supply to two power reception terminals.

FIG. 12 shows the example of simultaneous wireless power supply to two power reception terminals. FIG. 12 is obtained by adding a power reception terminal 3E to FIG. 5. The beam pattern BP1, which is the space sharing pattern, can preferably supply power to the power reception terminal 3D, but is not suitable for the power reception terminal 3E. The beam pattern BP2, which is the time sharing pattern, is a beam pattern suitable for both the power reception terminal 3D and the power reception terminal 3E. In such a case, switching from the beam pattern BP1 to the beam pattern BP2 in the middle can increase the power reception efficiency of the power reception terminal 3E, which has been insufficient through the beam pattern BP1. Furthermore, the total power reception efficiency of the power reception terminals 3D and 3E can be increased. The operation of this flowchart is applicable not only to the case of multiple power reception terminals serving as the power supply targets, but also to the case of one terminal. Hereinafter, this third operation example is described in detail.

In step S601, for the wireless LAN channel used by the AP 1 itself, the AP 1 checks whether each of one or more beam patterns at the power transmission device 6 is the time sharing pattern or the space sharing pattern. That is, the one or more beam patterns are classified into the time sharing pattern and the space sharing pattern.

In step S801, the AP 1 selects the beam pattern from among the space sharing patterns classified in step S601, and causes the power transmission device 6 to execute wireless power supply to the multiple power reception terminals 3 according to the selected beam pattern. For example, the beam pattern that allows multiple power reception terminals to have the highest average power transmission efficiency may be selected. Alternatively, the beam pattern may be selected with respect to another reference. The selected beam pattern is not necessarily a pattern that is most suitable for each power reception terminal, only if the power supply amount required for each power reception terminal is estimated to be supplied. After execution of the wireless power supply, the processing proceeds to step S802.

In step S802, the AP 1 collects received electric energy information on the multiple power reception terminals. To collect the received electric energy information, the power transmission device 6 performs BLE communication with the multiple power reception terminals to obtain the received electric energy information, and transmits the obtained received electric energy information to the AP 1. According to another example, the AP 1 may perform BLE communication directly with the multiple power reception terminals 3, and obtain the received electric energy information.

In step S803, it is determined whether the completion condition is satisfied or not. If the completion condition is not satisfied (NO in S803), the processing proceeds to step S804. If the completion condition is satisfied (YES in S803), this operation is finished. For example, power transmission with a preliminarily scheduled power supply amount to all or at least a certain number or a certain ratio of power reception terminals is completed, it is determined that the completion condition is satisfied.

In step S804, it is determined whether a constant time period elapses after a reference time or not. The reference time is, for example, a time when wireless power supply is started in step S801, or a time when wireless power supply is executed in step S801 at the time of returning from step S608. A time other than the times listed here may be adopted as the reference time. If it is determined that the constant time period has not elapsed (NO in step S804), the processing returns to step S801. If it is determined that the constant time period has elapsed (YES in step S804), the processing proceeds to step S805.

In step S805, it is determined whether there is a power reception terminal having insufficient supplied electric energy among the power reception terminals. For example, if a predetermined electric energy is required to be supplied in the constant time period and there is a power reception terminal having the supplied electric energy having not reached the predetermined electric energy, it is determined that there is a power reception terminal having an insufficient supplied electric energy. The predetermined electric energy may be the electric energy determined by the AP 1 or the power transmission device 6. In a case where the power supply amount is designated as a power supply request by the power reception terminal, the designated electric energy may be the predetermined electric energy. According to another determination example, if the remaining electric energy of the storage battery is required to reach the threshold in the constant time period and there is a power reception terminal with energy having not reached the threshold, it is determined that there is a power reception terminal having an insufficient supplied electric energy. The determination may be made according to a method other than the methods described here. If there is a power reception terminal having an insufficient supplied electric energy, the processing proceeds to step S806. If not, the processing proceeds to step S608.

In step S806, the AP 1 selects the beam pattern from among the time sharing patterns classified in step S601. The AP 1 confirms the availability condition of the wireless LAN channel, and transmits a frame (here, assumed as "CTS-to-self" frame) designating the wireless LAN channel use period. The AP 1 executes wireless power supply to the power reception terminal 3 using the power transmission device 6 during the secured period. Subsequently, the processing proceeds to step S807.

In step S807, the AP 1 collects received electric energy information from the multiple power reception terminals. The details of the process are analogous to those in step S802. Subsequently, the processing proceeds to step S608.

In step S608, it is determined whether a completion condition is satisfied or not. If the completion condition is not satisfied (NO in step S608), the processing returns to step S801. If the completion condition is satisfied (YES in step S608), the operation is finished. The operation of this step is the same as that in step S803 described above.

In this flowchart, steps S806 and S807 are performed once and subsequently the processing returns to step S801. Alternatively, steps S806 and S807 may be repeated multiple times and then the processing may return to step S801.

In this flowchart, the pattern is selected preferentially from among the space sharing patterns, and if there is a terminal having an insufficient received electric energy with the selected pattern, the pattern is selected from among the time sharing patterns. This may be inverted. That is, the pattern is selected preferentially from among the time sharing patterns, and if there is a terminal having an insufficient received electric energy with the selected pattern, the pattern may be selected from among the space sharing patterns.

Second Embodiment

In the first embodiment, the example where the wireless power supply system is disposed in the factory has been described. In this embodiment, an example where the wireless power supply system is disposed in an automobile is described. The automobile may be an EV (Electric Vehicle), a hybrid EV, a gasoline-fueled vehicle, or another type.

Figure 13:
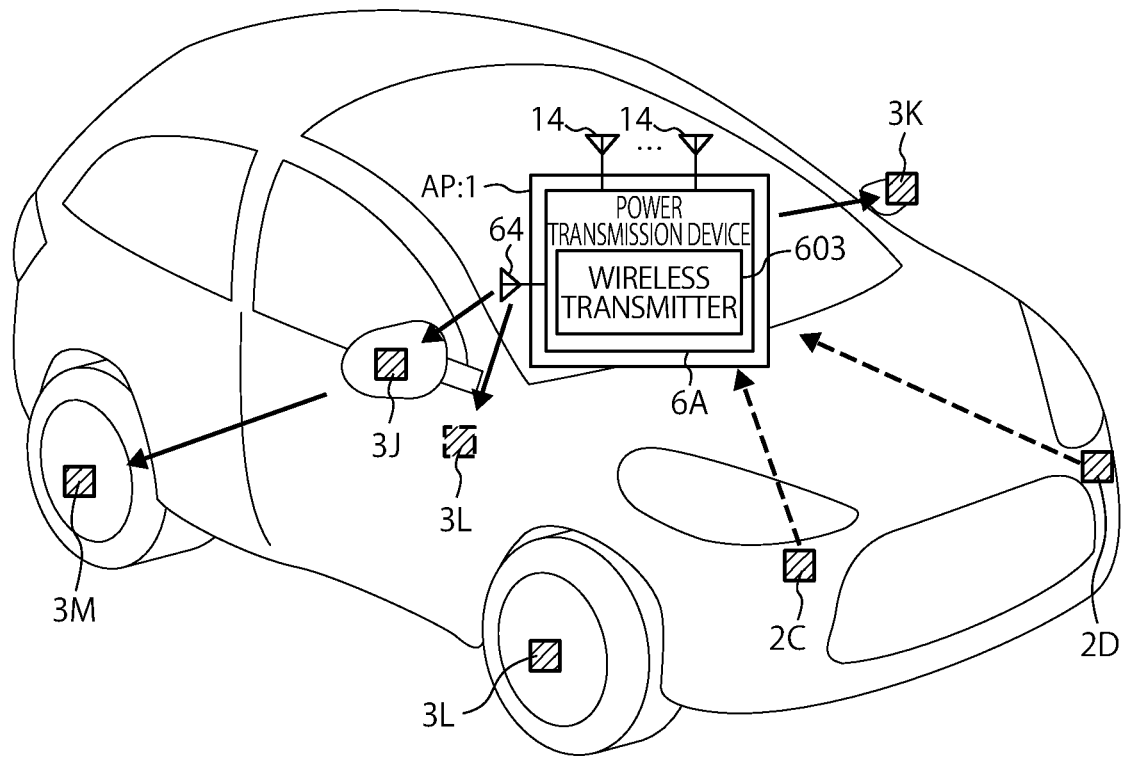
FIG. 13 shows an example of disposing the wireless power supply system according to a second embodiment in an automobile.

FIG. 13 shows an example of disposing the wireless power supply system according to the second embodiment in an automobile. The AP 1, the wireless communication terminals 2C and 2D, power reception terminals 3J, 3K, 3L and 3M are arranged. The AP 1 internally includes a power transmission device 6A. The AP 1 is disposed on the ceiling or the floor of the vehicle, for example. The power reception terminals 3J and 3K are disposed at the respective sideview mirrors. The power reception terminal 3M is disposed at a tire wheel. The power reception terminal 3L is disposed in a seat. Alternatively, the power reception terminals may be disposed at sites other than those sites. The power reception terminals 3J, 3K, 3L and 3M are BLE terminals, and are sensor devices including sensors, for example. Examples of the sensor include a door open and close sensor, a human detection sensor, an acceleration sensor, a temperature sensor, a tire air pressure sensor, or an engine temperature sensor. However, the sensor is not limited thereto. The wireless communication terminals 2C and 2D are disposed at a front bumper. The wireless communication terminals 2C and 2D are devices mounted with sensors that measure the state of the automobile or the environment around the automobile. In this example, the wireless communication terminals 2C and 2D internally include cameras, obtain images forward, respectively, and transmit data on taken images to the AP 1.

In the first embodiment, the AP 1 controls the externally connected power transmission device 6. In this second embodiment, the AP 1 controls the internally connected power transmission device 6A. The configuration of the power transmission device 6A includes the wireless transmitter 603 and the antennas 64 of the power transmission device 6 shown in FIG. 6. The power transmission device 6A is connected to the controller 105 of the AP 1, and is controlled by the controller 105. Control and BLE communication pertaining to power supply may be respectively performed by the controller 105 and the BLE communicator 111 included in the AP 1. As with the first embodiment, the power transmission device 6A in the AP 1 may be externally connected to the AP 1. In this case, the power transmission device 6A may be disposed at any site, such as the ceiling or the floor.

In the wireless power supply system disposed in the automobile as described above, operations analogous to those in the first embodiment are achieved. In this case, the first embodiment is partially changed or enlarged. As for beam pattern selection, for example, the beam pattern may be selected according to the number of people in the vehicle, seats where the people are seated, the door open and close state (whether the doors are open or not), the window open and close state (whether windows are open or not), or a combination thereof. This is because the radio wave channel environment in the automobile is changed by the number and positions of people in the vehicle, the door open and close state, and the window open and close state. According to these conditions, data, such as a table or function defining the preferential order of beam patterns, may be preliminarily created, and the beam pattern may be selected according to the data. The first operation example to the third operation example described in the first embodiment may be switched according to these conditions.

Third Embodiment

Figure 14:
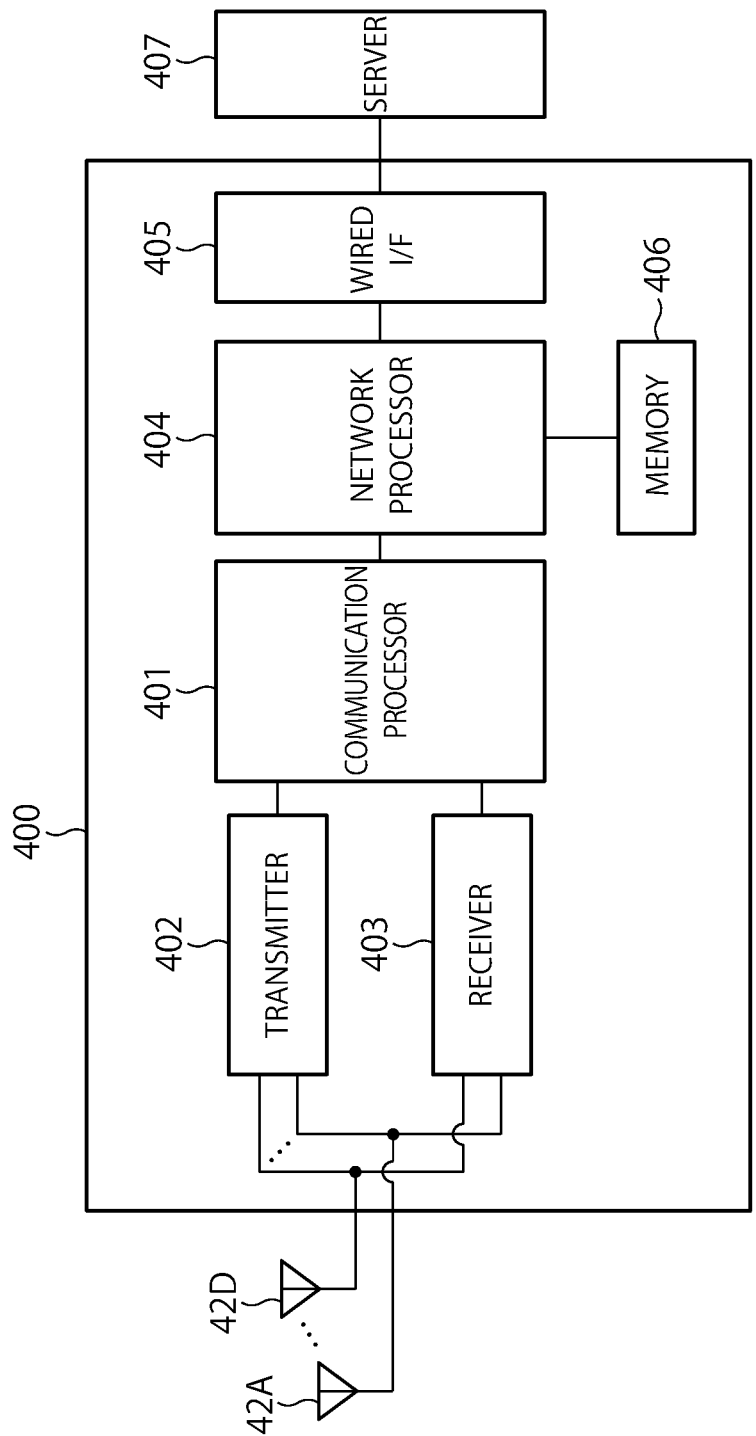
FIG. 14 is a functional block diagram of an access point or a terminal.

FIG. 14 is a functional block diagram of a base station (access point) 400 according to the present embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the previous embodiments. The transmitter 402 and the receiver 403 have functions similar to the transmitter and the receiver described in the previous embodiments. Alternatively, the transmitter 402 and the receiver 403 may perform analog domain processing in the transmitter and the receiver and the network processor 404 may perform digital domain processing in the transmitter and the receiver in the previous embodiment. The network processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to ninth embodiments may be cached in the memory 406. The frame transmitted by the base station in the first to ninth embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 14. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Fourth Embodiment

Figure 15:
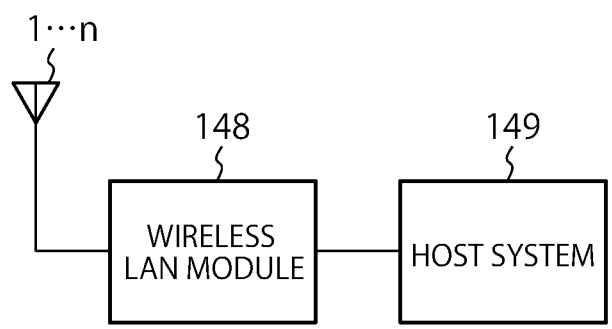
FIG. 15 shows an example of the overall configuration of the terminal or the access point.

FIG. 15 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the previous embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 16:
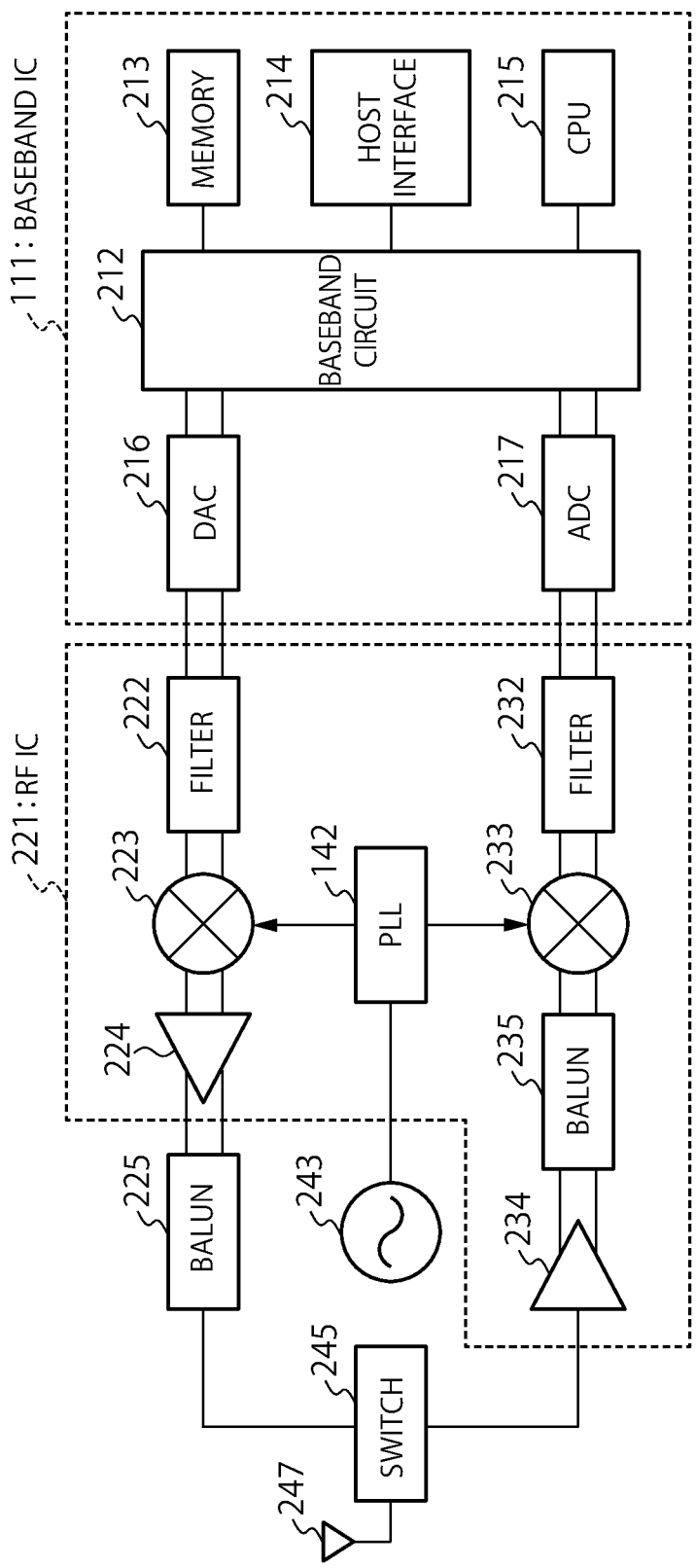
FIG. 16 shows a hardware configuration example of a wireless communication device mounted on the terminal or the access point.

FIG. 16 shows an example of hardware configuration of an access point (base station), a WLAN terminal or a BLE terminal. When the WLAN and the BLE terminal are both provided, the configuration shown in the figure may be provided for each case and may be mounted. The functions of the WLAN and BLE may be mounted in one chip or may be arranged in a dispersed manner in different chips. All of elements shown in the figure are not required to be provided, a part of elements may be omitted or replaced, and another element may be added.

In the configuration shown in figure, at least one antenna 247 is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The antenna 247 may be a phased array antenna or a directivity variable antenna.

Fifth Embodiment

Figure 17:
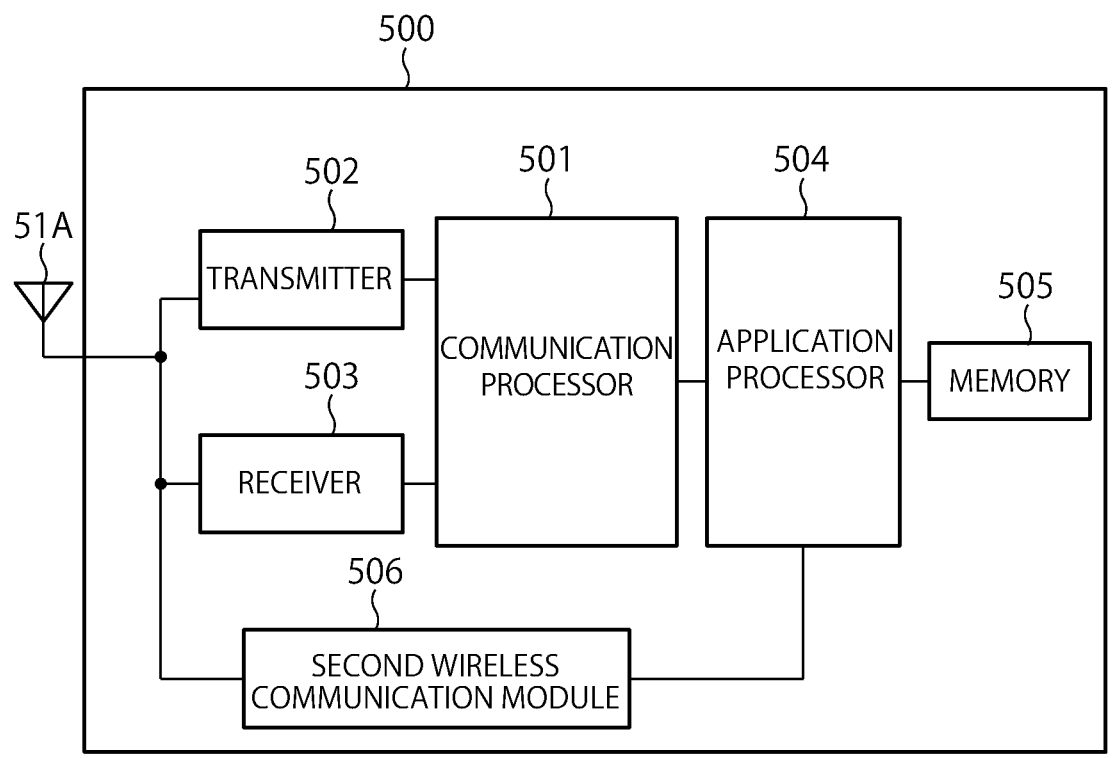
FIG. 17 is a functional block diagram of the terminal or the access point.

FIG. 17 is a functional block diagram of the terminal (STA) 500 according to the present embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to the controller as described in the previous embodiments. The transmitter 502 and the receiver 503 have the functions similar to the transmitter and the receiver as described in the previous embodiments. The transmitter 502 and the receiver 503 may perform analog domain processing in the transmitter and the receiver as described in the previous embodiments and the communication processor 501 may perform digital domain processing in the transmitter and the receiver as described in the previous embodiments. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 have the similar configuration to the WLAN module as shown in FIG. 15 or FIG. 16 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth™, LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

Sixth Embodiment

Figure 18A:
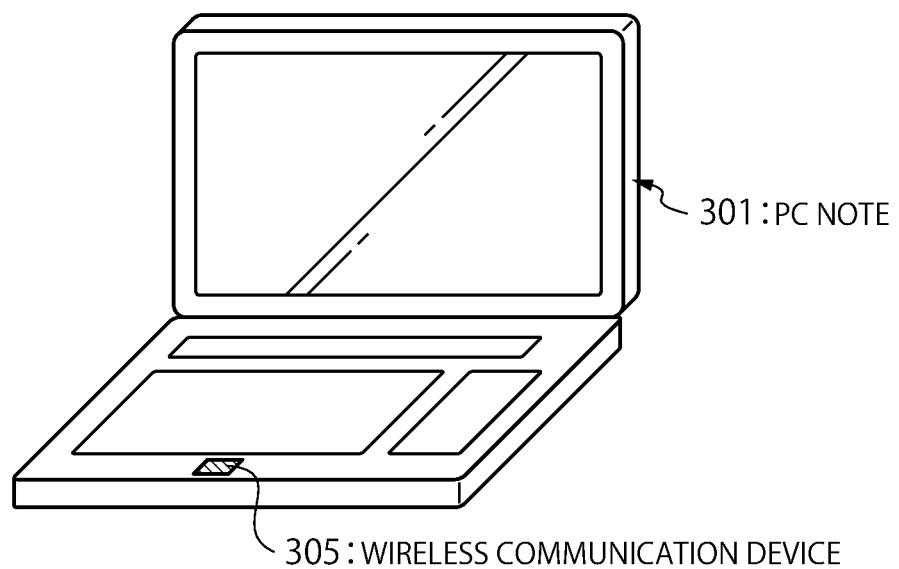
FIG. 18A is a perspective view of the terminal according to an embodiment of the present invention.
Figure 18B:
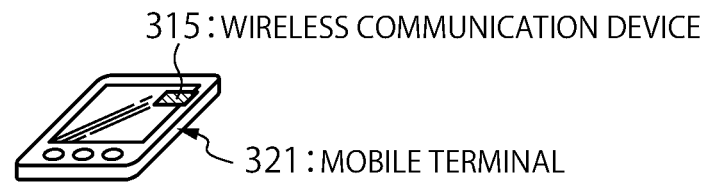
FIG. 18B is a perspective view of the terminal according to an embodiment of the present invention.

FIG. 18A and FIG. 18B are perspective views of wireless terminal according to the present embodiment. The wireless terminal in FIG. 18A is a notebook PC 301 and the wireless communication device (or a wireless device) in FIG. 18B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 19:
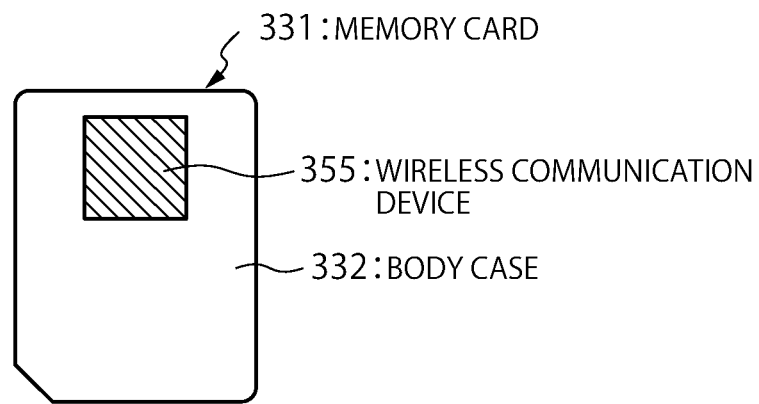
FIG. 19 shows a memory card according to an embodiment of the present invention.

Moreover, a wireless communication device installed in a terminal (which may indicate a base station) can also be provided in a memory card. FIG. 19 illustrates an example of a wireless communication device mounted on a memory card. A memory card 331 contains a wireless communication device 355 and a body case 332. The memory card 331 uses the wireless communication device 355 for wireless communication with external devices. Here, in FIG. 19, the description of other installed elements (for example, a memory, and so on) in the memory card 331 is omitted.

Seventh Embodiment

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Eighth Embodiment

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Ninth Embodiment

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Tenth Embodiment

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Eleventh Embodiment

In the present embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Twelfth Embodiment

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Thirteenth Embodiment

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Fourteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Fifteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.
[1] Frame Type in Communication System Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.
[2] Technique of Disconnection Between Wireless Communication Devices For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 20:
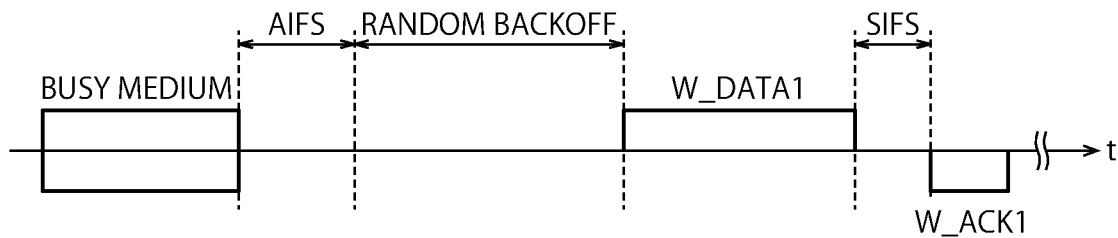
FIG. 20 shows an example of frame exchange in a contention period.

Here, FIG. 20 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller (controlling circuitry), a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. An electronic apparatus connectable with a first wireless communicator conforming to a first wireless communication scheme, comprising:
    a power transmitter configured to supply power to one or more apparatuses at one of a first beam pattern and a second beam pattern; and
    control circuitry configured to;
        set a first power supply period on a first condition that the first power supply period is prohibited to overlap with a communication period of the first wireless communicator if the power is supplied at the first beam pattern, and set a second power supply period on a second condition that the second power supply period is allowed to at least partially overlap with the communication period if the power is supplied at the second beam pattern.

2. The electronic apparatus according to claim 1,
wherein the first wireless communicator is included in a first wireless communication apparatus different from the electronic apparatus, and
the electronic apparatus is connected to the first wireless communication apparatus via wired or wireless.

3. The electronic apparatus according to claim 1, further comprising the first wireless communicator,
wherein the power transmitter and the first wireless communicator are connected to each other via wire or wireless.

4. The electronic apparatus according to claim 1,
wherein a center frequency of a frequency band used by the power transmitter to supply the power is outside of a frequency band of a plurality of frequency channels used for the first wireless communication scheme.

5. The electronic apparatus according to claim 1,
wherein the controlling circuitry refers to a measurement result of an interference between a wireless communication network and the plurality of beam patterns, the wireless communication network being connected to the first wireless communicator, and
the controlling circuitry
selects a beam pattern to interfere among the beam patterns, as the first beam pattern, and
selects a beam pattern not to interfere among the beam patterns, as the second beam pattern.

6. The electronic apparatus according to claim 1,
wherein the controlling circuitry checks an availability condition of a wireless communication network to which the first wireless communicator is connected, and
the controlling circuitry selects the first beam pattern if the wireless communication network is available, and the controlling circuitry selects the second beam pattern if the communication network is unavailable.

7. The electronic apparatus according to claim 1,
wherein the controlling circuitry selects the second beam pattern,
the power transmitter supplies power to the one or more apparatuses at the second beam pattern, and
the controlling circuitry switches the second beam pattern to the first beam pattern as a function of a received electric energy of the one or more apparatuses.

8. The electronic apparatus according to claim 1,
wherein the electronic apparatus transmits a frame for reservation of the first power supply period via the first wireless communicator if the first beam pattern is used, and
the power transmitter supplies the power to the one or more apparatuses at the first beam pattern in the reserved first power supply period.

9. The electronic apparatus according to claim 1,
wherein the controlling circuitry transmits information to instruct transmitting a frame for reservation of the first power supply period, to another wireless communication device, the other wireless communication device being configured to execute the first wireless communication scheme, and the power transmitter supplies the power to the one or more apparatuses at the first beam pattern in the first power supply period instructed in the information.

10. The electronic apparatus according to claim 1, further comprising
a second wireless communicator configured to communicate with the one or more apparatuses according to a second wireless communication scheme,
wherein the second wireless communicator receives information for identifying electric energy supplied to the one or more apparatuses, and
the controlling circuitry sets at least one of the first power supply period and the second power supply period, based on the received information.

11. The electronic apparatus according to claim 1,
wherein the controlling circuitry receives information designating a value of at least one of the first power supply period and the second power supply period, from another wireless communication device, the other wireless communication device being configured to execute the first wireless communication scheme, and
the controlling circuitry sets at least one of the first power supply period and the second power supply period, based on the received information.

12. A system, comprising
an electronic apparatus according to claim 1;
a first apparatus;
a second apparatus,
wherein
the electronic apparatus, the first apparatus and the second apparatus are mounted on an automobile,
the first apparatus and the second apparatus each comprises a sensor, the sensor measuring a state of the automobile or an environment around the automobile.

13. The system according to claim 12,
wherein the controlling circuitry selects the first beam pattern or the second beam pattern according to a boarding condition of the automobile.

14. A system, comprising
an electronic apparatus according to claim 1;
a first apparatus;
a second apparatus,
wherein
the electronic apparatus, the first apparatus, and the second apparatus are disposed in a factory,
the first apparatus is a device in the factory, and
the second apparatus is a product produced in the factory or a device in the factory.

15. A power supply method performed in an electronic apparatus, the electronic apparatus being connectable with a first wireless communicator conforming to a first wireless communication scheme, comprising:
selecting one beam pattern from a first beam pattern and a second beam pattern;
setting a first power supply period on a first condition that the first power supply period is prohibited to overlap with a communication period of the first wireless communicator if the first beam pattern is selected;
setting a second power supply period on a second condition that the second power supply period is allowed to at least partially overlap with the communication period if the second beam pattern is selected;
supplying power to one or more devices in the first power supply period if the first beam patter is selected; and supplying power to the one or more devices in the second power supply period if the second beam patter is selected.

\* \* \* \* \*